US012665130B2

(12) United States Patent
Nishibayashi

(10) Patent No.: US 12,665,130 B2
(45) Date of Patent: Jun. 23, 2026

(54) MULTILAYER CERAMIC CAPACITOR

(71) Applicant: Murata Manufacturing Co., Ltd., Nagaokakyo (JP)

(72) Inventor: Kazuhiro Nishibayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 309 days.

(21) Appl. No.: 18/621,165

(22) Filed: Mar. 29, 2024

(65) Prior Publication Data

US 2024/0266110 A1    Aug. 8, 2024

Related U.S. Application Data

(63) Continuation of application No. PCT/JP2023/006022, filed on Feb. 20, 2023.

(30) Foreign Application Priority Data

Jun. 8, 2022    (JP) ................................. 2022-093117

(51) Int. Cl.
| | |
|---|---|
| *H01G 4/30* | (2006.01) |
| *H01G 4/012* | (2006.01) |
| *H01G 4/12* | (2006.01) |
| *H01G 4/224* | (2006.01) |
| *H01G 4/248* | (2006.01) |

(52) U.S. Cl.
CPC ........... *H01G 4/012* (2013.01); *H01G 4/1227* (2013.01); *H01G 4/248* (2013.01); *H01G 4/30* (2013.01)

(58) Field of Classification Search
CPC ...... H01G 4/012; H01G 4/1227; H01G 4/248; H01G 4/30
See application file for complete search history.

(56) References Cited

U.S. PATENT DOCUMENTS

| | | | | |
|---|---|---|---|---|
| 2011/0110014 A1* | 5/2011 | Hirata | ..................... | H01G 4/005 |
| | | | | 156/89.12 |
| 2013/0002388 A1* | 1/2013 | Kim | ......................... | H01G 4/30 |
| | | | | 336/200 |
| 2016/0196917 A1* | 7/2016 | Lim | ....................... | H01G 4/012 |
| | | | | 361/301.4 |
| 2018/0102217 A1* | 4/2018 | Fukunaga | .............. | H01G 4/232 |
| 2021/0104364 A1* | 4/2021 | Okuda | ................. | H01G 4/1218 |

(Continued)

FOREIGN PATENT DOCUMENTS

| | | |
|---|---|---|
| JP | 2006100682 A | 4/2006 |
| JP | 2008085041 A | 4/2008 |

(Continued)

OTHER PUBLICATIONS

International Search Report in PCT/JP2023/006022, mailed May 9, 2023, 3 pages.

(Continued)

*Primary Examiner* — Michael P McFadden
(74) *Attorney, Agent, or Firm* — Keating & Bennett, LLP

(57) ABSTRACT

A multilayer ceramic capacitor includes first and second internal electrode layers extending in a length direction and a width direction. Coverage ratios in regions R11 and R12 are higher than a coverage ratio in a region R15, and/or coverage ratios in regions R13 and R14 are higher than the coverage ratio in the region R15.

20 Claims, 14 Drawing Sheets

(56) References Cited

U.S. PATENT DOCUMENTS

| 2022/0165496 A1 * | 5/2022 | Nishikori | ................. H01G 4/30 |
| 2023/0115608 A1 * | 4/2023 | Sugita | .................... H01G 4/224 |
| | | | 361/301.4 |
| 2024/0234030 A1 * | 7/2024 | Yasuda | .................... H01G 2/12 |

FOREIGN PATENT DOCUMENTS

| JP | 2013041886 A | 2/2013 |
| JP | 2015053512 A | 3/2015 |

OTHER PUBLICATIONS

Written Opinion in PCT/JP2023/006022, mailed May 9, 2023, 3 pages.

* cited by examiner

MULTILAYER CERAMIC CAPACITOR

CROSS REFERENCE TO RELATED APPLICATIONS

This application claims the benefit of priority to Japanese Patent Application No. 2022-093117 filed on Jun. 8, 2022 and is a Continuation Application of PCT Application No. PCT/JP2023/006022 filed on Feb. 20, 2023. The entire contents of each application are hereby incorporated herein by reference.

BACKGROUND OF THE INVENTION

1. Field of the Invention

The present invention relates to multilayer ceramic capacitors.

2. Description of the Related Art

Recently, as electronic products have become smaller and have higher capacitances, multilayer ceramic capacitors that are used in electronic products have also been required to be smaller and have higher capacitances. The trend toward higher frequencies, lower voltages, and lower power consumption in electronic products has raised demand for multilayer ceramic capacitors having lower equivalent series inductance (also referred to below as "ESL"). Examples of known multilayer ceramic capacitors having lower ESL include a three-terminal multilayer ceramic capacitor (see, for example, Japanese Unexamined Patent Application, Publication No. 2013-41886).

Such a three-terminal multilayer ceramic capacitor includes a capacitor body (multilayer body), signal terminal electrodes (first and second external electrodes) provided on opposite end surfaces of the capacitor body, and grounding terminal electrodes (third and fourth external electrodes) provided on opposite lateral surfaces of the capacitor body. Inside the capacitor body, signal internal electrodes (first internal electrode layers) that extend to the opposite end surfaces of the capacitor body and grounding internal electrodes (second internal electrode layers) that extend to the opposite lateral surfaces are alternately stacked. This three-terminal multilayer ceramic capacitor achieves a reduction in ESL through a reduction in distance between the external electrodes and a resulting reduction in current path length.

Further a reduction of equivalent series inductance (ESL) is desired for three-terminal multilayer ceramic capacitors such as those described above.

SUMMARY OF THE INVENTION

Example embodiments of the present invention provide multilayer ceramic capacitors that each achieve a reduction in equivalent series inductance (ESL).

A multilayer ceramic capacitor according to an example embodiment of the present invention includes a multilayer body, first and second external electrodes, and third and fourth external electrodes. The multilayer body includes a plurality of dielectric layers made of a ceramic material and a plurality of internal electrode layers laminated therein. The multilayer body includes first and second main surfaces opposed to each other in a lamination direction, first and second lateral surfaces opposed to each other in a width direction intersecting the lamination direction, and first and second end surfaces opposed to each other in a length direction intersecting the lamination direction and the width direction. The first and second external electrodes are respectively provided on the first and second end surfaces of the multilayer body. The third and fourth external electrodes are respectively provided on the first and second lateral surfaces of the multilayer body. The plurality of internal electrode layers include a plurality of first internal electrode layers each including a first counter electrode portion and a plurality of second internal electrode layers each including a second counter electrode portion. The first counter electrode portion and the second counter electrode portion are opposed to each other in the lamination direction. The plurality of first internal electrode layers extend in the length direction and are connected to the first and second external electrodes, and the plurality of second internal electrode layers extend in the width direction and are connected to the third and fourth external electrodes. The plurality of first internal electrode layers each include, in the width direction, a side portion adjacent to the first lateral surface, a side portion adjacent to the second lateral surface, and a first middle portion located between the side portion adjacent to the first lateral surface and the side portion adjacent to the second lateral surface, and each include a region R11, a region R12, a region R13, a region R14, and a region R15. The region R11 is located in the side portion adjacent to the first lateral surface and extends from the first end surface to a portion of the first counter electrode portion adjacent to the first end surface. The region R12 is located in the side portion adjacent to the second lateral surface and extends from the first end surface to a portion of the first counter electrode portion adjacent to the first end surface. The region R13 is located in the side portion adjacent to the first lateral surface and extends from the second end surface to a portion of the first counter electrode portion adjacent to the second end surface. The region R14 is located in the side portion adjacent to the second lateral surface and extends from the second end surface to a portion of the first counter electrode portion adjacent to the second end surface. The region R15 is a remaining region other than the region R11, the region R12, the region R13, and the region R14, and includes the first middle portion. In at least one of the plurality of first internal electrode layers, a coverage ratio in the region R11 and a coverage ratio in the region R12 are higher than a coverage ratio in the region R15, and/or a coverage ratio in the region R13 and a coverage ratio in the region R14 are higher than the coverage ratio in the region R15.

A multilayer ceramic capacitor according to an example embodiment of the present invention includes a multilayer body, first and second external electrodes, and third and fourth external electrodes. The multilayer body includes a plurality of dielectric layers made of a ceramic material and a plurality of internal electrode layers laminated therein. The multilayer body includes first and second main surfaces opposed to each other in a lamination direction, first and second lateral surfaces opposed to each other in a width direction intersecting the lamination direction, and first and second end surfaces opposed to each other in a length direction intersecting the lamination direction and the width direction. The first and second external electrodes are respectively provided on the first and second end surfaces of the multilayer body. The third and fourth external electrodes are respectively provided on the first and second lateral surfaces of the multilayer body. The plurality of internal electrode layers include a plurality of first internal electrode layers each having a first counter electrode portion and a plurality of second internal electrode layers each having a second counter electrode portion. The first counter electrode portion and the second counter electrode portion are opposed to each other in the lamination direction. The plurality of first internal electrode layers extend in the length direction and are connected to the first and second external electrodes, and the plurality of second internal electrode layers extend in the width direction and are connected to the third and fourth external electrodes. The plurality of second internal electrode layers each include, in the length direction, an end portion adjacent to the first end surface, an end portion adjacent to the second end surface, and a second middle portion located between the end portion adjacent to the first end surface and the end portion adjacent to the second end surface, and each include a region R21, a region R22, a region R23, a region R24, and a region R25. The region R21 is located in the end portion adjacent to the first end surface and extends from the first lateral surface to a portion of the second counter electrode portion adjacent to the first lateral surface. The region R22 is located in the end portion adjacent to the second end surface and extends from the first lateral surface to a portion of the second counter electrode portion adjacent to the first lateral surface. The region R23 is located in the end portion adjacent to the first end surface and extends from the second lateral surface to a portion of the second counter electrode portion adjacent to the second lateral surface. The region R24 is located in the end portion adjacent to the second end surface and extends from the second lateral surface to a portion of the second counter electrode portion adjacent to the second lateral surface. The region R25 is a remaining region other than the region R21, the region R22, the region R23, and the region R24, and includes the second middle portion. In at least one of the plurality of second internal electrode layers, a coverage ratio in the region R21 and a coverage ratio in the region R22 are higher than a coverage ratio in the region R25, and/or a coverage ratio in the region R23 and a coverage ratio in the region R24 are higher than the coverage ratio in the region R25.

According to example embodiments of the present invention, it is possible to reduce equivalent series inductance (ESL) of multilayer ceramic capacitors.

The above and other elements, features, steps, characteristics and advantages of the present invention will become more apparent from the following detailed description of the example embodiments with reference to the attached drawings.

BRIEF DESCRIPTION OF THE DRAWINGS

FIG. 12 is a cross-sectional view (LT cross section) taken along line XII-XII of the multilayer body shown in FIG. 11, and is an LT cross-sectional view corresponding to FIG. 7.

FIG. 13 is a cross-sectional view showing an LT cross section of a multilayer body in a conventional multilayer ceramic capacitor and corresponding to FIG. 7.

DETAILED DESCRIPTION OF THE EXAMPLE EMBODIMENTS

Figure 1:
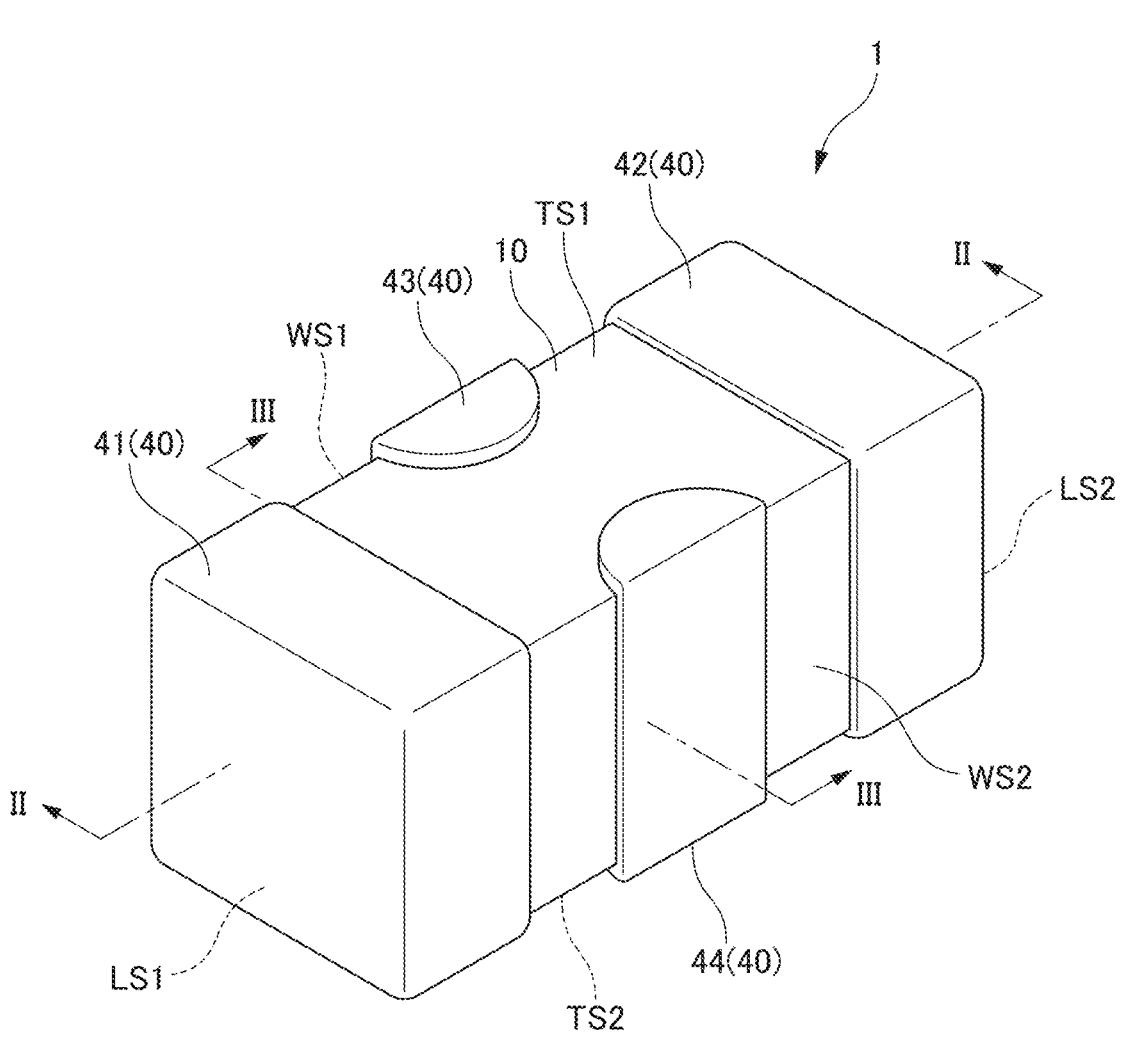
FIG. 1 is a perspective view of a multilayer ceramic capacitor according to an example embodiment of the present invention.
Figure 1:
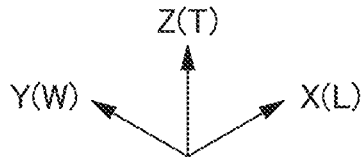

The following describes example embodiments of the present invention with reference to the accompanying drawings. In the drawings, the same or corresponding portions are denoted by the same reference numerals.

Multilayer Ceramic Capacitor

Figure 2:
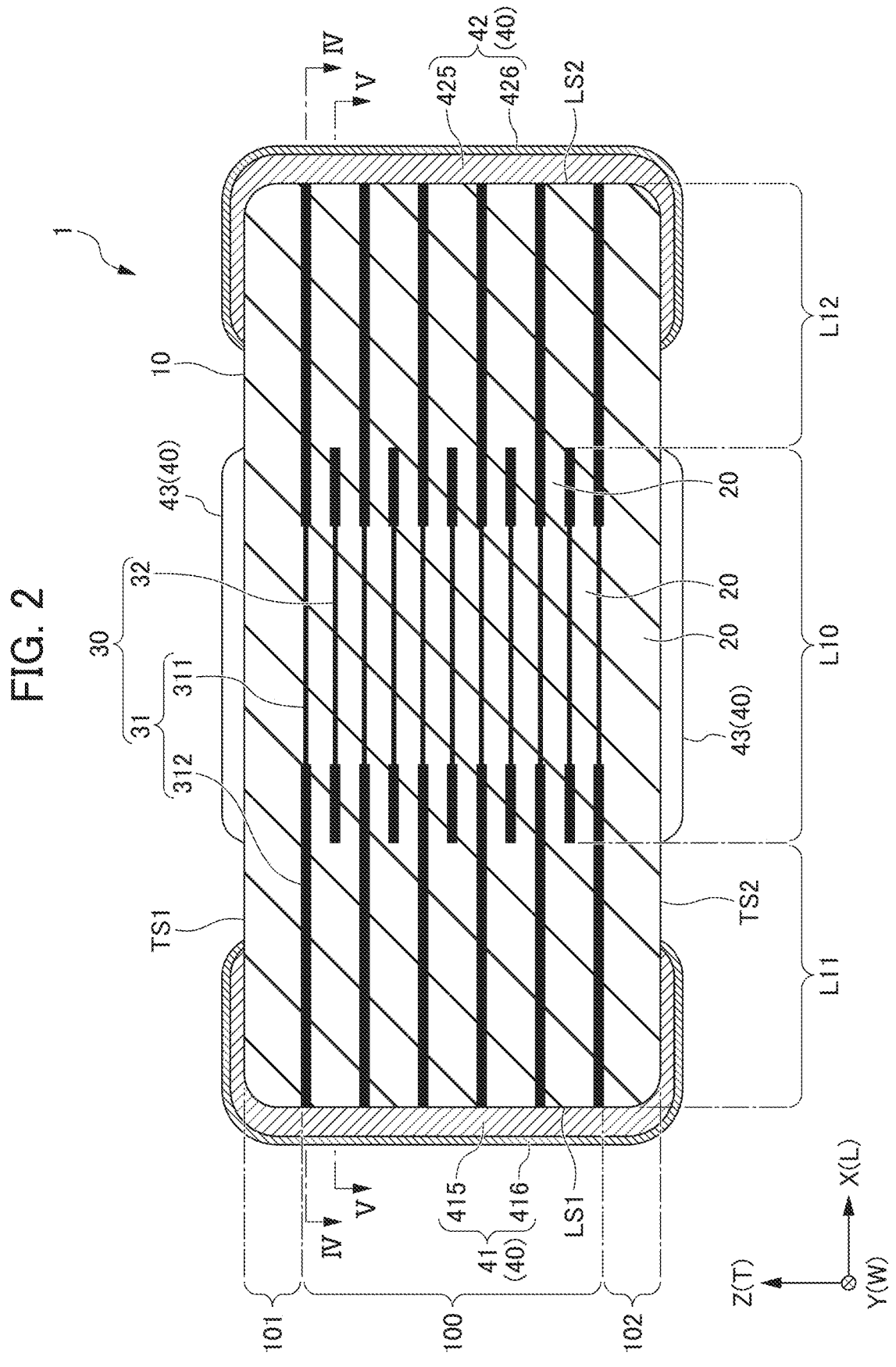
FIG. 2 is a cross-sectional view (LT cross section) taken along line II-II of the multilayer ceramic capacitor shown in FIG. 1.
Figure 3:
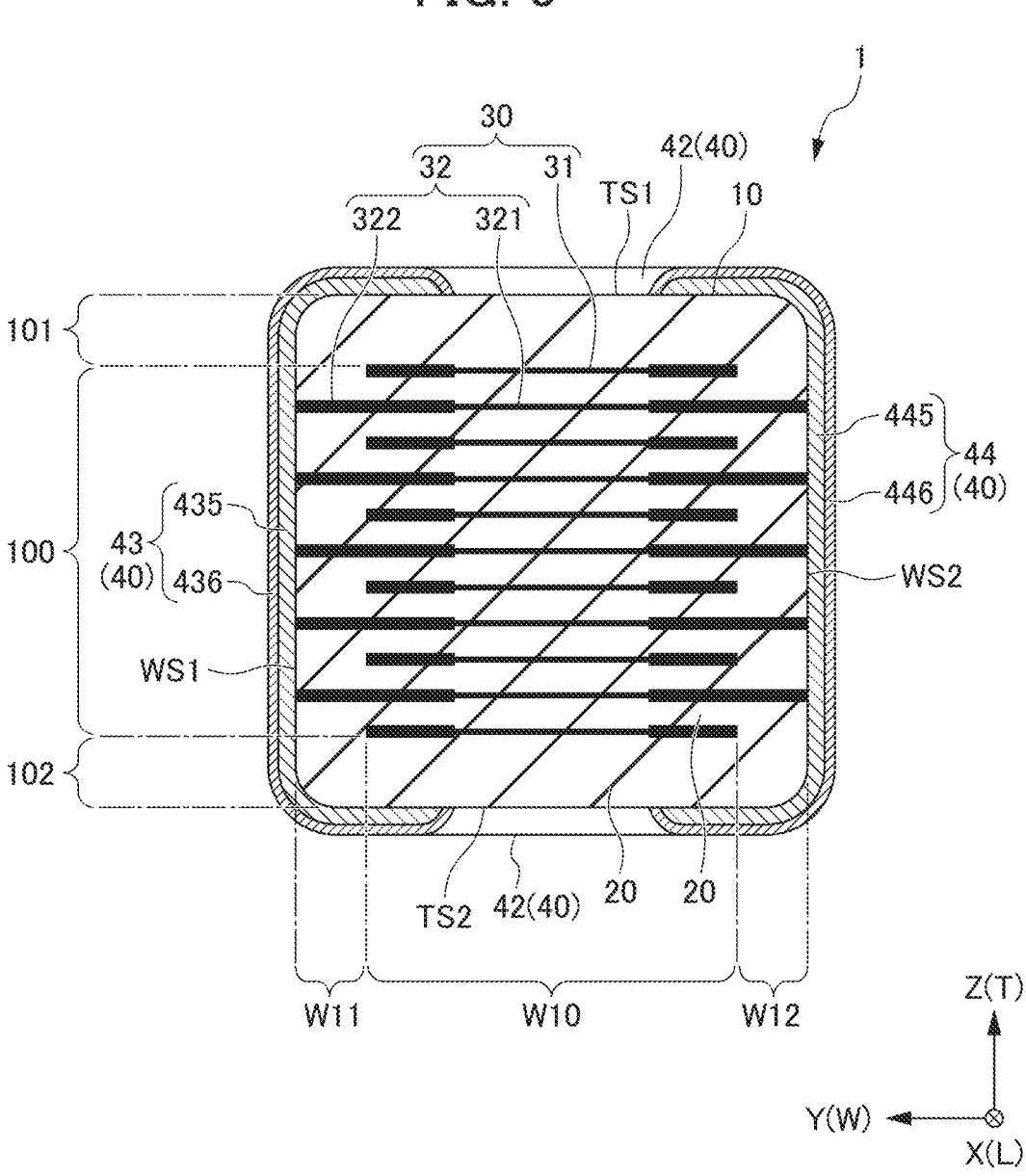
FIG. 3 is a cross-sectional view (WT cross section) taken along line III-III of the multilayer ceramic capacitor shown in FIG. 1.

FIG. 1 is a perspective view of a multilayer ceramic capacitor according to an example embodiment of the present invention. FIG. 2 is a cross-sectional view taken along line II-II of the multilayer ceramic capacitor shown in FIG. 1. FIG. 3 is a cross-sectional view taken along line III-III of the multilayer ceramic capacitor shown in FIG. 1. A multilayer ceramic capacitor 1 shown in FIGS. 1 to 3 includes a multilayer body 10 and external electrodes 40. The external electrodes 40 include a first external electrode 41, a second external electrode 42, a third external electrode 43, and a fourth external electrode 44. As described above, the multilayer ceramic capacitor 1 includes the third external electrode 43, which is the third electrode, and the fourth external electrode 44 in addition to the first external electrode 41 and the second external electrode 42, and thus is referred to as a three-terminal multilayer ceramic capacitor.

FIGS. 1 to 3 and other drawings referenced below each show an XYZ orthogonal coordinate system. The X direction refers to the length direction L of the multilayer ceramic capacitor 1 and the multilayer body 10. The Y direction refers to the width direction W of the multilayer ceramic capacitor 1 and the multilayer body 10. The Z direction refers to the lamination direction T of the multilayer ceramic capacitor 1 and the multilayer body 10. Thus, the cross section shown in FIG. 2 is also referred to as an LT cross section, and the cross section shown in FIG. 3 is also referred to as a WT cross section.

The length direction L, the width direction W, and the lamination direction T are not necessarily orthogonal or substantially orthogonal to each other, and may intersect each other.

The multilayer body 10 has a rectangular or substantially rectangular parallelepiped shape, and includes a first main surface TS1 and a second main surface TS2, which are opposed to each other in the lamination direction T, a first lateral surface WS1 and a second lateral surface WS2, which are opposed to each other in the width direction W, and a first end surface LS1 and a second end surface LS2, which are opposed to each other in the length direction L.

The corner portions and ridge portions of the multilayer body 10 are preferably rounded. The corner portions each refer to a portion where three surfaces of the multilayer body 10 intersect, and the ridge portions each refer to a portion where two surfaces of the multilayer body 10 intersect.

As shown in FIGS. 2 and 3, the multilayer body 10 includes a plurality of dielectric layers 20 and a plurality of internal electrode layers 30 laminated in the lamination direction T. The multilayer body 10 includes an inner layer portion 100, and a first outer layer portion 101 and a second outer layer portion 102 that sandwich the inner layer portion 100 in the lamination direction T.

The inner layer portion 100 includes the plurality of internal electrode layers 30 and some of the plurality of dielectric layers 20. In the inner layer portion 100, the plurality of internal electrode layers 30 are opposed to each other with the dielectric layers 20 interposed therebetween. The inner layer portion 100 generates capacitance and substantially defines and functions as a capacitor.

The first outer layer portion 101 is located adjacent to the first main surface TS1 of the multilayer body 10, and the second outer layer portion 102 is located adjacent to the second main surface TS2 of the multilayer body 10. More specifically, the first outer layer portion 101 is located between the internal electrode layer 30 closest to the first main surface TS1 among the plurality of internal electrode layers 30 and the first main surface TS1, and the second outer layer portion 102 is located between the internal electrode layer 30 closest to the second main surface TS2 among the plurality of internal electrode layers 30 and the second main surface TS2. The first outer layer portion 101 and the second outer layer portion 102 do not include any of the internal electrode layers 30, but include the dielectric layers 20 other than those for the inner layer portion 100. The first outer layer portion 101 and the second outer layer portion 102 each function as a protective layer of the inner layer portion 100.

As a material of the dielectric layers 20, for example, a dielectric ceramic containing $BaTiO_3$, $CaTiO_3$, $SrTiO_3$, $CaZrO_3$, or the like as a main component can be used. As a material of the dielectric layers 20, for example, at least one of Mg, Si, Mn, a rare earth element, Al, Ni, V, or the like may be added as a subcomponent. Thus, the dielectric layers 20 include, for example, Ba or Ti as a main component, and at least one of Mg, Si, Mn, a rare earth element, Al, Ni, V, or the like as a subcomponent. The dielectric layers 20 may include, for example, as a rare earth element, at least one of La, Ce, Pr, Nd, Sm, Eu, Gd, Tb, Dy, Ho, Er, Tm, Yb, Lu or Y, among which Dy is preferred. Each dielectric layer 20 includes a plurality of dielectric grains. In the present specification, the main component is defined as a component having the highest weight %.

The thickness of the dielectric layers 20 is not particularly limited, but may be, for example, about 0.40 μm or more and about 5.0 μm or less. The number of the dielectric layers 20 is not particularly limited, but may be, for example, 10 or more and 2000 or less. The number of the dielectric layers 20 is a sum of the number of the dielectric layers in the inner layer portion and the number of the dielectric layers in the outer layer portion.

As shown in FIGS. 2 and 3, the plurality of internal electrode layers 30 include a plurality of first internal electrode layers 31 and a plurality of second internal electrode layers 32. The plurality of first internal electrode layers 31 and the plurality of second internal electrode layers 32 are alternately provided in the lamination direction T of the multilayer body 10.

The first internal electrode layers 31 each include a first counter electrode portion 311 and two first extension electrode portions 312, and the second internal electrode layers 32 each include a second counter electrode portion 321 and two second extension electrode portions 322.

The first counter electrode portion 311 and the second counter electrode portion 321 are opposed to each other with a dielectric layer 20 interposed therebetween in the lamination direction T of the multilayer body 10. The shape of the first counter electrode portion 311 and the shape of the second counter electrode portion 321 are not particularly limited, and may be, for example, rectangular or substantially rectangular. The first counter electrode portion 311 and the second counter electrode portion 321 are portions (effective portions) that generate capacitance and substantially define and function as a capacitor.

One of the first extension electrode portions 312 extends from the first counter electrode portion 311 toward the first end surface LS1 of the multilayer body 10, and is exposed at the first end surface LS1. The other first extension electrode portion 312 extends from the first counter electrode portion 311 toward the second end surface LS2 of the multilayer body 10, and is exposed at the second end surface LS2. One of the second extension electrode portions 322 extends from the second counter electrode portion 321 toward the first lateral surface WS1 of the multilayer body 10, and is exposed at the first lateral surface WS1. The other second extension electrode portion 322 extends from the second counter electrode portion 321 toward the second lateral surface WS2 of the multilayer body 10, and is exposed at the second lateral surface WS2. The shape of the first extension electrode portions 312 and the shape of the second extension electrode portions 322 are not particularly limited, and may be, for example, rectangular or substantially rectangular.

In this configuration, the first internal electrode layers 31 extend in the length direction L and are connected to the first external electrode 41 and the second external electrode 42. In the width direction W, the first lateral surface WS1 of the multilayer body 10 and the edges of the first internal electrode layers 31 adjacent to the first lateral surface WS1 include a gap therebetween, and the second lateral surface WS2 of the multilayer body 10 and the edges of the first internal electrode layers 31 adjacent to the second lateral surface WS2 include a gap therebetween. The second internal electrode layers 32 extend in the width direction W and are connected to the third external electrode 43 and the fourth external electrode 44. In the length direction L, the first end surface LS1 of the multilayer body 10 and the edges of the second internal electrode layers 32 adjacent to the first end surface LS1 include a gap therebetween, and the second end surface LS2 of the multilayer body 10 and the edges of the second internal electrode layers 32 adjacent to the second end surface LS2 include a gap therebetween.

The first internal electrode layers 31 and the second internal electrode layers 32 includes metal Ni as a main component, for example. Furthermore, the first internal electrode layers 31 and the second internal electrode layers 32 may include, for example, at least one selected from metals such as Cu, Ag, Pd, or Au, and alloys including at least one of these metals such as an Ag—Pd alloy, as a main component or as a component other than the main component. Furthermore, the first internal electrode layers 31 and the second internal electrode layers 32 may include, as a component other than the main component, dielectric particles having the same composition as ceramic included in the dielectric layers 20. In the present specification, the metal included as a main component is defined as a metal component having the highest weight %.

The thickness of the first internal electrode layers 31 and the thickness of the second internal electrode layers 32 are not particularly limited, but may be, for example, about 0.40 μm or more and about 5.0 μm or less. The number of the first internal electrode layers 31 and the number of the second internal electrode layers 32 are not particularly limited, but may be, for example, 10 or more and 2000 or less.

As shown in FIG. 2, the multilayer body 10 includes, in the length direction L, an electrode counter portion L10 in which the first internal electrode layers 31 and the second internal electrode layers 32 of the internal electrode layers 30 are opposed to each other, a first end margin portion L11, and a second end margin portion L12. The first end margin portion L11 is located between the electrode counter portion L10 and the first end surface LS1, and the second end margin portion L12 is located between the electrode counter portion L10 and the second end surface LS2. More specifically, the first end margin portion L11 is located between the first end surface LS1 and the edges of the second internal electrode layers 32 adjacent to the first end surface LS1, and the second end margin portion L12 is located between the second end surface LS2 and the edges of the second internal electrode layers 32 adjacent to the second end surface LS2. The first end margin portion L11 and the second end margin portion L12 do not include any of the second internal electrode layers 32, and include the first internal electrode layers 31 and the dielectric layers 20. The first end margin portion L11 defines and functions as an extension electrode portion of the first internal electrode layers 31 that extends to the first end surface LS1, and the second end margin portion L12 defines and functions as an extension electrode portion of the first internal electrode layers 31 that extends to the second end surface LS2. The first end margin portion L11 and the second end margin portion L12 are each also referred to as an end gap or an L gap.

Furthermore, as shown in FIG. 3, the multilayer body 10 includes, in the width direction W, an electrode counter portion W10 in which the first internal electrode layers 31 and the second internal electrode layers 32 of the internal electrode layers 30 are opposed to each other, a first side margin portion W11, and a second side margin portion W12. The first side margin portion W11 is located between the electrode counter portion W10 and the first lateral surface WS1, and the second side margin portion W12 is located between the electrode counter portion W10 and the second lateral surface WS2. More specifically, the first side margin portion W11 is located between the first lateral surface WS1 and the edges of the first internal electrode layers 31 adjacent to the first lateral surface WS1, and the second side margin portion W12 is located between the second lateral surface WS2 and the edges of the first internal electrode layers 31 adjacent to the second lateral surface WS2. The first side margin portion W11 and the second side margin portion W12 do not include any of the first internal electrode layers 31, and include the second internal electrode layers 32 and the dielectric layers 20. The first side margin portion W11 functions as an extension electrode portion of the second internal electrode layers 32 that extends to the first lateral surface WS1, and the second side margin portion W12 functions as an extension electrode portion of the second internal electrode layers 32 that extends to the second lateral surface WS2. The first side margin portion W11 and the second side margin portion W12 are each also referred to as a side gap or a W gap.

The first counter electrode portions 311 of the first internal electrode layers 31 and the second counter electrode portions 321 of the second internal electrode layers 32 described above are located in the electrode counter portion L10 and the electrode counter portion W10. Furthermore, the first extension electrode portions 312 of the first internal electrode layers 31 described above are located in the first end margin portion L11 and the second end margin portion L12, and the second extension electrode portions 322 of the second internal electrode layers 32 described above are located in the first side margin portion W11 and the second side margin portion W12.

The dimensions of the multilayer body 10 described above are not particularly limited but, for example, the length in the length direction L may be about 0.6 mm or more and about 1.8 mm or less, the width in the width direction W may be about 0.3 mm or more and about 1.0 mm or less, and the thickness in the lamination direction T may be about 0.3 mm or more and about 1.0 mm or less. Furthermore, the dimensions of the multilayer ceramic capacitor 1 including the external electrodes 40, which will be described below, are not particularly limited but, for example, the length in the length direction L may be about 0.6 mm or more and about 1.8 mm or less, the width in the width direction W may be about 0.3 mm or more and about 1.0 mm or less, and the thickness in the lamination direction T may be about 0.3 mm or more and about 1.0 mm or less.

Examples of methods for measuring the thickness of the dielectric layers 20 and the thickness of the internal electrode layers 30 include a method that involves exposing an LT cross section of a central area of the multilayer body in the width direction by polishing, and observing the LT cross section using a scanning electron microscope. The value of the thickness may be an average value of measurement values at a plurality of positions in the length direction, or may be an average value of measurement values at a plurality of positions in the lamination direction.

Similarly, examples of methods for measuring the thickness of the multilayer body 10 or the thickness of the multilayer ceramic capacitor 1 include a method that involves exposing an LT cross section of a central area of the multilayer body in the width direction by polishing, and observing the LT cross section using a scanning electron microscope, or exposing a WT cross section of a central area of the multilayer body or the multilayer ceramic capacitor in the length direction by polishing, and observing the WT cross section using a scanning electron microscope. The value of the thickness may be an average value of measurement values at a plurality of positions in the length direction or the width direction. Similarly, examples of methods for measuring the length of the multilayer body 10 or the length of the multilayer ceramic capacitor 1 include a method that involves exposing an LT cross section of a central area of the multilayer body or the multilayer ceramic capacitor in the width direction by polishing, and observing the LT cross section using a scanning electron microscope. The value of the length may be an average value of measurement values at a plurality of positions in the lamination direction. Similarly, examples of methods for measuring the width of the multilayer body 10 or the width of the multilayer ceramic capacitor 1 include a method that involves exposing a WT cross section of a central area of the multilayer body or the multilayer ceramic capacitor in the length direction by polishing, and observing the WT cross section using a scanning electron microscope. The value of the width may be an average value of measurement values at a plurality of positions in the lamination direction.

The external electrodes 40 include the first external electrode 41, the second external electrode 42, the third external electrode 43, and the fourth external electrode 44.

The first external electrode 41 is provided on the first end surface LS1 of the multilayer body 10 and is connected to the first internal electrode layers 31. The first external electrode 41 may extend from the first end surface LS1 to a portion of the first main surface TS1 and a portion of the second main surface TS2. Furthermore, the first external electrode 41 may extend from the first end surface LS1 to a portion of the first lateral surface WS1 and a portion of the second lateral surface WS2.

The second external electrode 42 is provided on the second end surface LS2 of the multilayer body 10 and is connected to the first internal electrode layers 31. The second external electrode 42 may extend from the second end surface LS2 to a portion of the first main surface TS1 and a portion of the second main surface TS2. Furthermore, the second external electrode 42 may extend from the second end surface LS2 to a portion of the first lateral surface WS1 and a portion of the second lateral surface WS2.

The third external electrode 43 is provided on a portion of the first lateral surface WS1 of the multilayer body 10 between the first external electrode 41 and the second external electrode 42, and is connected to the second internal electrode layers 32. The third external electrode 43 may extend from the first lateral surface WS1 to a portion of the first main surface TS1 and a portion of the second main surface TS2.

The fourth external electrode 44 is provided on a portion of the second lateral surface WS2 of the multilayer body 10 between the first external electrode 41 and the second external electrode 42, and is connected to the second internal electrode layers 32. The fourth external electrode 44 may extend from the second lateral surface WS2 to a portion of the first main surface TS1 and a portion of the second main surface TS2.

The first external electrode 41 includes a first base electrode layer 415 and a first plated layer 416, and the second external electrode 42 includes a second base electrode layer 425 and a second plated layer 426. The third external electrode 43 includes a third base electrode layer 435 and a third plated layer 436, and the fourth external electrode 44 includes a fourth base electrode layer 445 and a fourth plated layer 446. The first external electrode 41 may include only the first plated layer 416, and the second external electrode 42 may include only the second plated layer 426. The third external electrode 43 may include only the third plated layer 436, and the fourth external electrode 44 may include only the fourth plated layer 446.

The first base electrode layer 415, the second base electrode layer 425, the third base electrode layer 435, and the fourth base electrode layer 445 may be fired layers including a metal and glass. As for the glass, the fired layers may include a glass component including at least one of B, Si, Ba, Mg, Al, Li, or the like. Specific examples of usable glass components include borosilicate glass, for example. As for the metal, the fired layers include, for example, Cu as a main component. Furthermore, as for the metal, the fired layers may include, for example, as a main component or as a component other than the main component, at least one of metals such as Ni, Ag, Pd, and Au, and alloys such as an Ag—Pd alloy.

The fired layers are obtained by applying an electrically conductive paste including a metal and glass to the multilayer body by, for example, a dipping method and firing the electrically conductive paste. This firing may be performed after firing the internal electrode layers, or may be performed simultaneously with the firing of the internal electrode layers. Each of the fired layers may include a plurality of layers.

Alternatively, the first base electrode layer 415, the second base electrode layer 425, the third base electrode layer 435, and the fourth base electrode layer 445 may be, for example, resin layers including electrically conductive particles and a thermosetting resin. The resin layers may be formed on the fired layers described above, or may be formed directly on the multilayer body without the fired layers formed therebetween.

The resin layers are obtained by applying an electrically conductive paste including electrically conductive particles and a thermosetting resin to a multilayer body by a coating method, and firing the electrically conductive paste. This firing may be performed after firing the internal electrode layers, or may be performed simultaneously with the firing of the internal electrode layers. Each of the resin layers may include a plurality of layers.

The thickness per layer of each of the first base electrode layer 415, the second base electrode layer 425, the third base electrode layer 435, and the fourth base electrode layer 445, which are fired layers or resin layers, is not particularly limited, and may be about 1 $\mu m$ or more and about 10 $\mu m$ or less, for example.

Alternatively, each of the first base electrode layer 415, the second base electrode layer 425, the third base electrode layer 435, and the fourth base electrode layer 445 may be formed by a thin film formation method such as, for example, a sputtering method or a vapor deposition method, and may be a thin film layer having a thickness of, for example, about 1 $\mu m$ or less in which metal particles are deposited.

The first plated layer 416 covers at least a portion of the first base electrode layer 415, and the second plated layer 426 covers at least a portion of the second base electrode layer 425. The third plated layer 436 covers at least a portion of the third base electrode layer 435, and the fourth plated layer 446 covers at least a portion of the fourth base electrode layer 445. The first plated layer 416, the second plated layer 426, the third plated layer 436, and the fourth plated layer 446 include, for example, at least one selected of metals such as Cu, Ni, Ag, Pd, and Au, and alloys such as an Ag—Pd alloy.

Each of the first plated layer 416, the second plated layer 426, the third plated layer 436, and the fourth plated layer 446 may include a plurality of layers. Preferably, each of the plated layers has a two-layer structure including, for example, a Ni plated layer and an Sn plated layer. The Ni plated layer can prevent the corresponding base electrode layer from being corroded by solder when a ceramic electronic component is mounted, and the Sn plated layer can improve the wettability of solder when the ceramic electronic component is mounted, facilitating the mounting.

The thickness per layer of each of the first plated layer 416, the second plated layer 426, the third plated layer 436, and the fourth plated layer 446 is not particularly limited, and may be, for example, about 1 μm or more and about 10 μm or less.

Internal Electrode Layer

Figure 4:
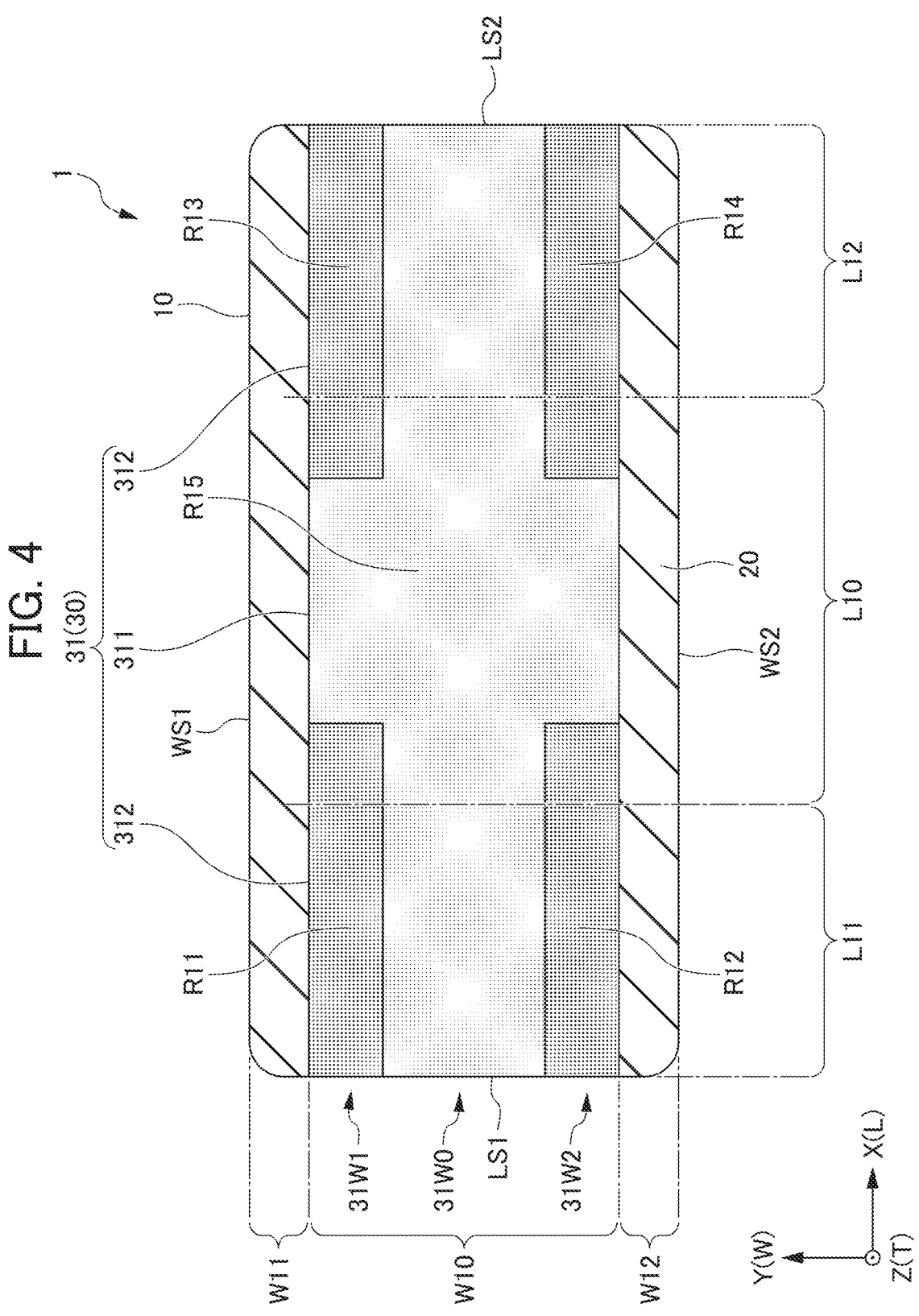
FIG. 4 is a cross-sectional view (LW cross section) taken along line IV-IV of a multilayer body in the multilayer ceramic capacitor shown in FIG. 2 and showing first internal electrode layers.
Figure 5:
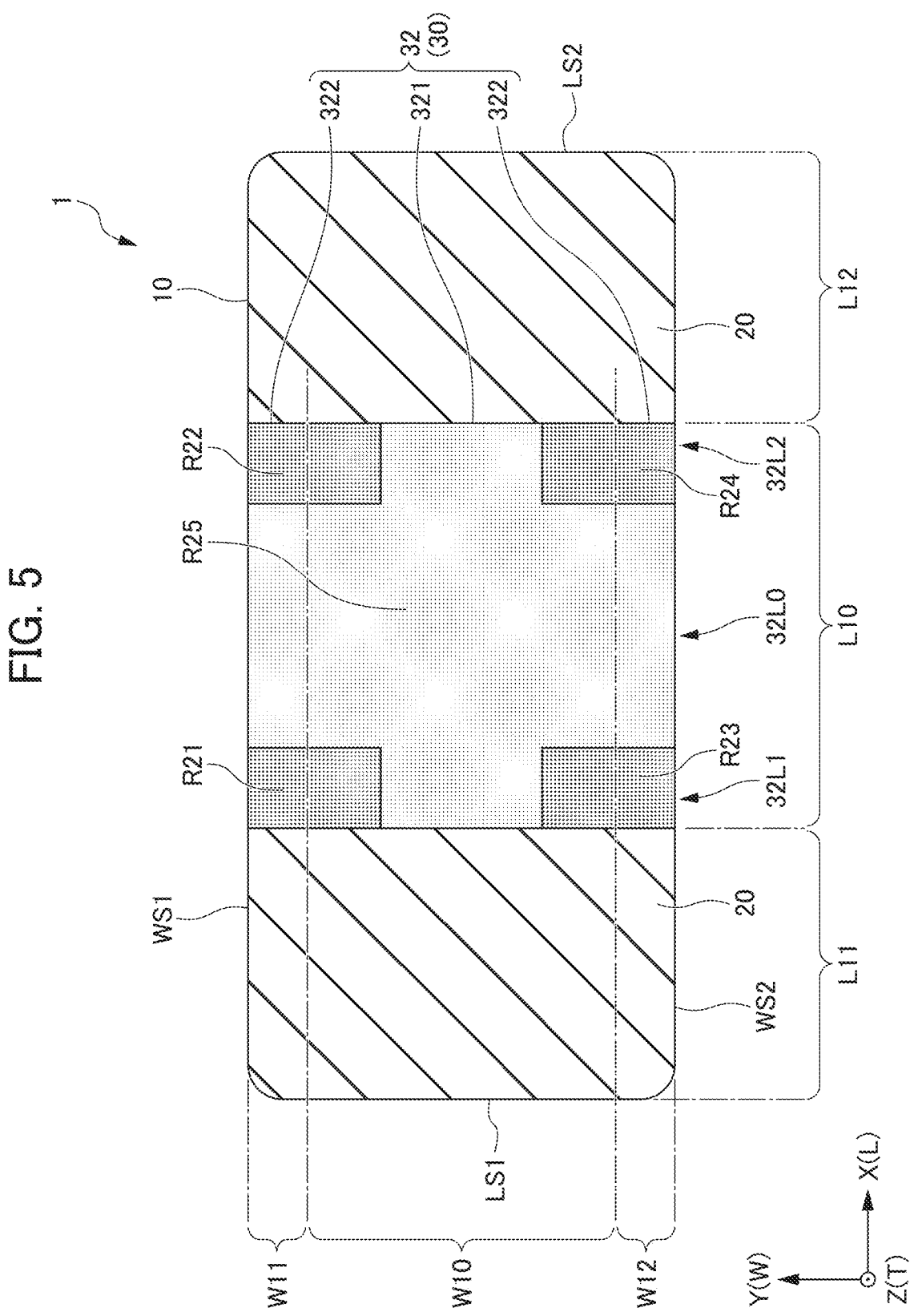
FIG. 5 is a cross-sectional view (LW cross section) taken along line V-V of the multilayer body in the multilayer ceramic capacitor shown in FIG. 2 and showing second internal electrode layers.
Figure 6:
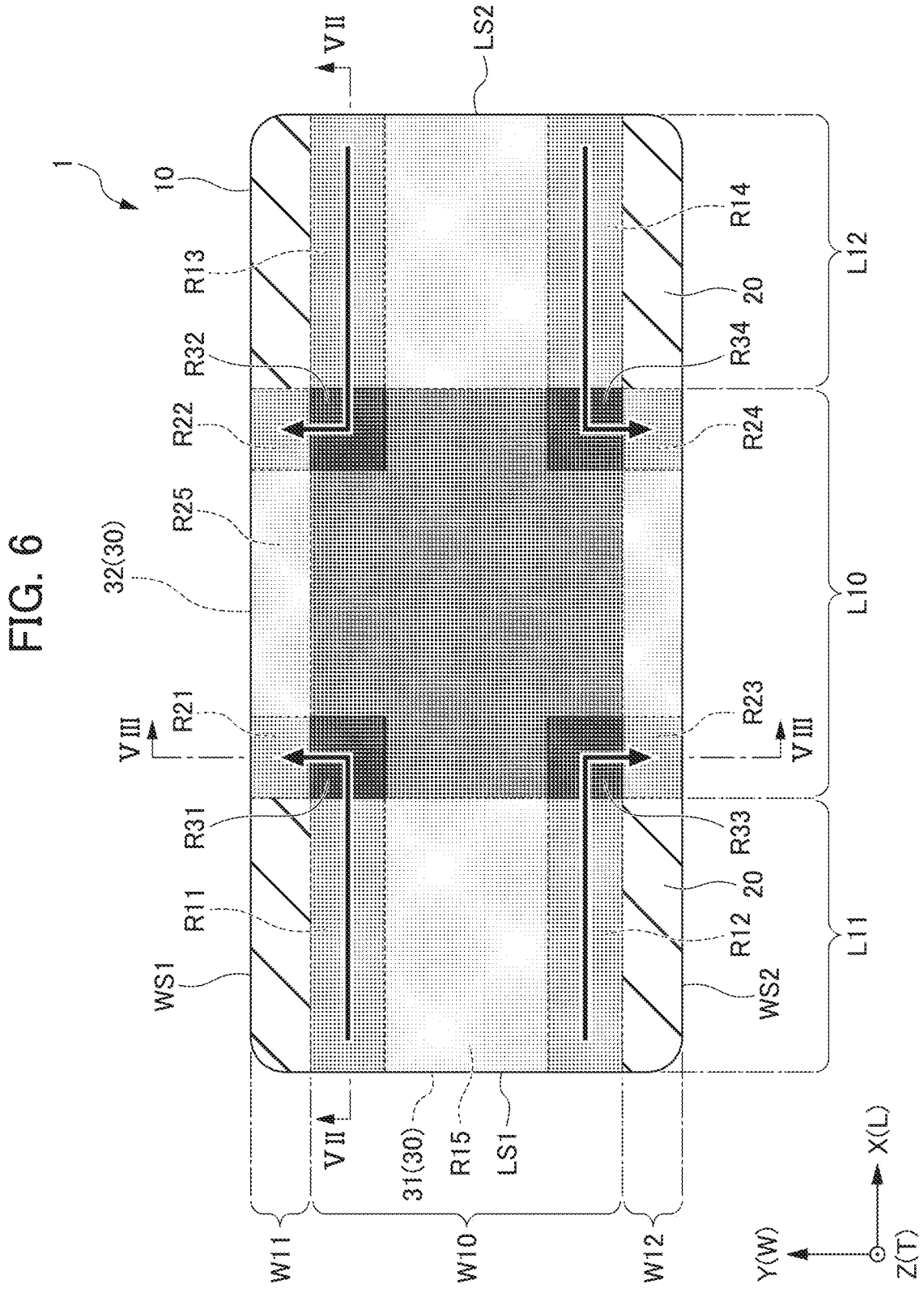
FIG. 6 is an overlaid cross-sectional view (LW cross section) including the cross section of the multilayer body shown in FIG. 4 and the cross section of the multilayer body shown in FIG. 5, in which the first internal electrode layers and the second internal electrode layers are overlaid on each other.

The following further describes the internal electrode layers 30, which in other words are the first internal electrode layers 31 and the second internal electrode layers 32. FIG. 4 is a cross-sectional view (LW cross section) taken along line IV-IV of the multilayer body in the multilayer ceramic capacitor shown in FIG. 2 and showing the first internal electrode layers. FIG. 5 is a cross-sectional view (LW cross section) taken along line V-V of the multilayer body in the multilayer ceramic capacitor shown in FIG. 2 and showing the second internal electrode layers. FIG. 6 is an overlaid cross-sectional view (LW cross section) including the cross section of the multilayer body shown in FIG. 4 and the cross section of the multilayer body shown in FIG. 5, in which the first internal electrode layers and the second internal electrode layers are overlaid on each other.

As shown in FIG. 4, the first internal electrode layers 31 each include, in the width direction W, a side portion 31W1 adjacent to the first lateral surface WS1, a side portion 31W2 adjacent to the second lateral surface WS2, and a first middle portion 31W0 located between the side portion 31W1 and the side portion 31W2. For example, the first internal electrode layers 31 are divided into n equal portions in the width direction W (n is a positive integer of 3 or more). In this case, the side portion 31W1 is the portion adjacent to the first lateral surface WS1, the side portion 31W2 is the portion adjacent to the second lateral surface WS2, and the first middle portion 31W0 is the remaining portion(s) between the side portion 31W1 and the side portion 31W2. More specifically, for example, the first internal electrode layers 31 are divided into four equal portions in the width direction W. In this case, the side portion 31W1 is the portion adjacent to the first lateral surface WS1, the side portion 31W2 is the portion adjacent to the second lateral surface WS2, and the first middle portion 31W0 is the remaining two portions.

The first internal electrode layers 31 each include a region R11 and a region R13 in the side portion 31W1, and a region R12 and a region R14 in the side portion 31W2. The region R11 in the side portion 31W1 extends from the first end surface LS1 to a portion of the first counter electrode portion 311 adjacent to the first end surface LS1 in the electrode counter portion L10 of the multilayer body 10. The region R12 in the side portion 31W2 extends from the first end surface LS1 to a portion of the first counter electrode portion 311 adjacent to the first end surface LS1. The region R13 in the side portion 31W1 extends from the second end surface LS2 to a portion of the first counter electrode portion 311 adjacent to the second end surface LS2. The region R14 in the side portion 31W2 extends from the second end surface LS2 to a portion of the first counter electrode portion 311 adjacent to the second end surface LS2.

The first internal electrode layers 31 also each include a region R15, which is a remaining region other than the region R11, the region R12, the region R13, and the region R14. The region R15 includes the first middle portion 31W0. The region R15 also includes a central portion of the first counter electrode portion 311 in the length direction L and the width direction W, and a central portion of the multilayer body 10 in the length direction L and the width direction W.

In each first internal electrode layer 31, a coverage ratio in the region R11, a coverage ratio in the region R12, a coverage ratio in the region R13, and a coverage ratio in the region R14 are higher than a coverage ratio in the region R15. Preferably, for example, the coverage ratio in the region R11×about 0.95, the coverage ratio in the region R12×about 0.95, the coverage ratio in the region R13×about 0.95, and the coverage ratio in the region R14×about 0.95 are higher than the coverage ratio in the region R15.

Firing the internal electrode layers as described below results in the formation of a plurality of holes in the internal electrode layers. The coverage ratio (also referred to as coverage) is the ratio of the area actually occupied by the internal electrode layer to the area where the internal electrode layer should be formed.

Examples of methods for measuring the coverage ratio in the region 11, the region 12, and the region 15 of each first internal electrode layer 31 include a method that involves exposing a WT cross section of the multilayer body 10 including the region 11, the region 12, and the region 15 of the first internal electrode layer 31 by polishing, and observing the WT cross section using a scanning electron microscope. For example, with respect to each region in the same WT cross section, a predetermined length of the region in the width direction W (for example, a length equivalent to the entire length of the region 11 or the region 12) is taken, and the ratio of the total length of segments of the internal electrode layer in the width direction W within the region to the predetermined length of the region in the width direction W is calculated as the coverage ratio in the region. The coverage ratio in each region may be an average value of coverage ratios in the region in the plurality of internal electrode layers in the lamination direction.

Similarly, examples of methods for measuring the coverage ratio in the region 13, the region 14, and the region 15 of each first internal electrode layer 31 include a method that involves exposing a WT cross section of the multilayer body 10 including the region 13, the region 14, and the region 15 of the first internal electrode layer 31 by polishing, and observing the WT cross section using a scanning electron microscope. For example, with respect to each region in the same WT cross section, a predetermined length of the region in the width direction W (for example, a length equivalent to the entire length of the region 13 or the region 14) is taken, and the ratio of the total length of segments of the internal electrode layer in the width direction W within the region to the predetermined length of the region in the width direction W is calculated as the coverage ratio in the region. The coverage ratio in each region may be an average value of coverage ratios in the region in the plurality of internal electrode layers in the lamination direction.

The method for increasing the coverage ratio in the region R11, the region R12, the region R13, and the region R14 is not particularly limited, and examples thereof include a method that involves increasing the thickness of these regions in the lamination direction. Alternatively, oxidation of these regions may be promoted prior to firing the internal electrode layers as described below. The inventor of the example embodiments of the present invention has discovered that oxidizing the internal electrode layers raises the melting point of the internal electrode layers, making it possible to increase the coverage ratio of the internal electrode layers in the firing. Alternatively, the proportion of Ni in the internal electrode layers may be increased. The inventor of the example embodiments of the present invention has discovered that increasing the proportion of Ni in the internal electrode layers increases the coverage ratio of the internal electrode layers.

As shown in FIGS. 2, 3, and 4, in each first internal electrode layer 31, the thickness of the region R11 in the lamination direction T, the thickness of the region R12 in the lamination direction T, the thickness of the region R13 in the lamination direction T, and the thickness of the region R14 in the lamination direction T are greater than the thickness of the region R15 in the lamination direction T. In other words, in each first internal electrode layer 31, the thickness of the region R15 in the lamination direction T is less than the thickness of the region R11 in the lamination direction T, the thickness of the region R12 in the lamination direction T, the thickness of the region R13 in the lamination direction T, and the thickness of the region R14 in the lamination direction T.

Examples of methods for measuring the thickness of the region 11, the region 13, and the region 15 of each first internal electrode layer 31 in the side portion 31W1 adjacent to the first lateral surface WS1 include a method that involves exposing an LT cross section of the multilayer body 10 including the region 11, the region 13, and the region 15 of the first internal electrode layer 31 in the side portion 31W1 adjacent to the first lateral surface WS1 by polishing, and observing the LT cross section using a scanning electron microscope. The value of the thickness may be an average value of measurement values at a plurality of positions in the length direction, or may be an average value of measurement values at a plurality of positions in the lamination direction.

Similarly, examples of methods for measuring the thickness of the region 12, the region 14, and the region 15 of each first internal electrode layer 31 in the side portion 31W2 adjacent to the second lateral surface WS2 include a method that involves exposing an LT cross section of the multilayer body 10 including the region 12, the region 14, and the region 15 of the first internal electrode layer 31 in the side portion 31W2 adjacent to the second lateral surface WS2 by polishing, and observing the LT cross section using a scanning electron microscope. The value of the thickness may be an average value of measurement values at a plurality of positions in the length direction, or may be an average value of measurement values at a plurality of positions in the lamination direction.

As shown in FIG. 5, the second internal electrode layers 32 each include, in the length direction L, an end portion 32L1 adjacent to the first end surface LS1, an end portion 32L2 adjacent to the second end surface LS2, and a second middle portion 32L0 located between the end portion 32L1 and the end portion 32L2. For example, the second internal electrode layers 32 are divided into n equal or substantially equal portions in the length direction L (n is a positive integer of 3 or more). In this case, the end portion 32L1 is the portion adjacent to the first end surface LS1, the end portion 32L2 is the portion adjacent to the second end surface LS2, and the second middle portion 32L0 is the remaining portion(s) between the end portion 32L1 and the end portion 32L2. More specifically, for example, the second internal electrode layers 32 are divided into four equal or substantially equal portions in the length direction L. In this case, the end portion 32L1 is the portion adjacent to the first end surface LS1, the end portion 32L2 is the portion adjacent to the second end surface LS2, and the second middle portion 32L0 is the remaining two portions.

The second internal electrode layers 32 each include a region R21 and a region R23 in the end portion 32L1, and a region R22 and a region R24 in the end portion 32L2. The region R21 in the end portion 32L1 extends from the first lateral surface WS1 to a portion of the second counter electrode portion 321 adjacent to the first lateral surface WS1 in the electrode counter portion W10 of the multilayer body 10. The region R22 in the end portion 32L2 extends from the first lateral surface WS1 to a portion of the second counter electrode portion 321 adjacent to the first lateral surface WS1. The region R23 in the end portion 32L1 extends from the second lateral surface WS2 to a portion of the second counter electrode portion 321 adjacent to the second lateral surface WS2. The region R24 in the end portion 32L2 extends from the second lateral surface WS2 to a portion of the second counter electrode portion 321 adjacent to the second lateral surface WS2.

The second internal electrode layers 32 also each include a region R25, which is a remaining region other than the region R21, the region R22, the region R23, and the region R24. The region R25 includes the second middle portion 32L0. The region R25 also includes a central portion of the second counter electrode portion 321 in the length direction L and the width direction W, and a central portion of the multilayer body 10 in the length direction L and the width direction W.

In each second internal electrode layer 32, a coverage ratio in the region R21, a coverage ratio in the region R22, a coverage ratio in the region R23, and a coverage ratio in the region R24 are higher than a coverage ratio in the region R25. Preferably, the coverage ratio in the region R21×about 0.95, the coverage ratio in the region R22×about 0.95, the coverage ratio in the region R23×about 0.95, and the coverage ratio in the region R24×about 0.95 are higher than the coverage ratio in the region R25.

Examples of methods for measuring the coverage ratio in the region 21, the region 22, and the region 25 of each second internal electrode layer 32 include a method that involves exposing an LT cross section of the multilayer body 10 including the region 21, the region 22, and the region 25 of the second internal electrode layer 32 by polishing, and observing the LT cross section using a scanning electron microscope. For example, with respect to each region in the same LT cross section, a predetermined length of the region in the length direction L (for example, a length equivalent to the entire length of the region 21 or the region 22) is taken, and the ratio of the total length of segments of the internal electrode layer in the length direction L within the region to the predetermined length of the region in the length direction L is calculated as the coverage ratio in the region. The coverage ratio in each region may be an average value of coverage ratios in the region in the plurality of internal electrode layers in the lamination direction.

Similarly, examples of methods for measuring the coverage ratio in the region 23, the region 24, and the region 25 of each second internal electrode layer 32 include a method that involves exposing an LT cross section of the multilayer body 10 including the region 23, the region 24, and the region 25 of the second internal electrode layer 32 by polishing, and observing the LT cross section using a scanning electron microscope. For example, with respect to each region in the same LT cross section, a predetermined length of the region in the length direction L (for example, a length equivalent to the entire length of the region 23 or the region 24) is taken, and the ratio of the total length of segments of the internal electrode layer in the length direction L within the region to the predetermined length of the region in the length direction L is calculated as the coverage ratio in the region. The coverage ratio in each region may be an average value of coverage ratios in the region in the plurality of internal electrode layers in the lamination direction.

The method for increasing the coverage ratio in the region R21, the region R22, the region R23, and the region R24 is not particularly limited as long as the method is the same or substantially the same as the method for increasing the coverage ratio in the region R11, the region R12, the region R13, and the region R14 of each first internal electrode layer 31 described above.

As shown in FIGS. 2, 3, and 5, in each second internal electrode layer 32, the thickness of the region R21 in the lamination direction T, the thickness of the region R22 in the lamination direction T, the thickness of the region R23 in the lamination direction T, and the thickness of the region R24 in the lamination direction T are greater than the thickness of the region R25 in the lamination direction T. In other words, in each second internal electrode layer 32, the thickness of the region R25 in the lamination direction T is less than the thickness of the region R21 in the lamination direction T, the thickness of the region R22 in the lamination direction T, the thickness of the region R23 in the lamination direction T, and the thickness of the region R24 in the lamination direction T.

Examples of methods for measuring the thickness of the region 21, the region 23, and the region 25 of each second internal electrode layer 32 in the end portion 32L1 adjacent to the first end surface LS1 include a method that involves exposing a WT cross section of the multilayer body 10 including the region 21, the region 23, and the region 25 of the second internal electrode layer 32 in the end portion 32L1 adjacent to the first end surface LS1 by polishing, and observing the WT cross section using a scanning electron microscope. The value of the thickness may be an average value of measurement values at a plurality of positions in the width direction, or may be an average value of measurement values at a plurality of positions in the lamination direction.

Similarly, examples of methods for measuring the thickness of the region 22, the region 24, and the region 25 of each second internal electrode layer 32 in the end portion 32L2 adjacent to the second end surface LS2 include a method that involves exposing a WT cross section of the multilayer body 10 including the region 22, the region 24, and the region 25 of the second internal electrode layer 32 in the end portion 32L2 adjacent to the second end surface LS2 by polishing, and observing the WT cross section using a scanning electron microscope. The value of the thickness may be an average value of measurement values at a plurality of positions in the width direction, or may be an average value of measurement values at a plurality of positions in the lamination direction.

As shown in FIG. 6, the region R11 of each first internal electrode layer 31 and the region R21 of each second internal electrode layer 32 overlap in the lamination direction T in a region R31. The region R31 is a portion of the first counter electrode portion 311 adjacent to the first end surface LS1 in the side portion 31W1 of the first internal electrode layer 31. The region R31 is also a portion of the second counter electrode portion 321 adjacent to the first lateral surface WS1 in the end portion 32L1 of the second internal electrode layer 32. This configuration allows a current path to be provided from the region R11 of the first internal electrode layer 31 to the region R21 of the second internal electrode layer 32, as indicated by an arrow in FIG. 6.

The region R12 of each first internal electrode layer 31 and the region R23 of each second internal electrode layer 32 overlap in the lamination direction T in a region R33. The region R33 is a portion of the first counter electrode portion 311 adjacent to the first end surface LS1 in the side portion 31W2 of the first internal electrode layer 31. The region R33 is also a portion of the second counter electrode portion 321 adjacent to the second lateral surface WS2 in the end portion 32L1 of the second internal electrode layer 32. This configuration allows a current path to be provided from the region R12 of the first internal electrode layer 31 to the region R23 of the second internal electrode layer 32, as indicated by an arrow in FIG. 6.

The region R13 of each first internal electrode layer 31 and the region R22 of each second internal electrode layer 32 overlap in the lamination direction T in a region R32. The region R32 is a portion of the first counter electrode portion 311 adjacent to the second end surface LS2 in the side portion 31W1 of the first internal electrode layer 31. The region R32 is also a portion of the second counter electrode portion 321 adjacent to the first lateral surface WS1 in the end portion 32L2 of the second internal electrode layer 32. This configuration allows a current path to be provided from the region R13 of the first internal electrode layer 31 to the region R22 of the second internal electrode layer 32, as indicated by an arrow in FIG. 6.

The region R14 of each first internal electrode layer 31 and the region R24 of each second internal electrode layer 32 overlap in the lamination direction T in a region R34. The region R34 is a portion of the first counter electrode portion 311 adjacent to the second end surface LS2 in the side portion 31W2 of the first internal electrode layer 31. The region R34 is also a portion of the second counter electrode portion 321 adjacent to the second lateral surface WS2 in the end portion 32L2 of the second internal electrode layer 32. This configuration allows a current path to be formed from the region R14 of the first internal electrode layer 31 to the region R24 of the second internal electrode layer 32, as indicated by an arrow in FIG. 6.

Manufacturing Method

The following describes a non-limiting example of a method for manufacturing the above-described multilayer ceramic capacitor 1. First, dielectric sheets for forming the dielectric layers 20 and an electrically conductive paste for forming the internal electrode layers 30 are prepared. The dielectric sheets and the electrically conductive paste each include a binder and a solvent. Known materials can be used as the binder and the solvent.

Next, an internal electrode pattern is formed on the dielectric sheets by, for example, printing the electrically conductive paste on the dielectric sheets in a predetermined pattern. As a method for forming the internal electrode pattern, for example, screen printing, gravure printing, or the like can be used.

Next, a predetermined number of dielectric sheets including no internal electrode pattern printed thereon are laminated for the second outer layer portion 102. On the second outer layer portion 102, the dielectric sheets including the internal electrode pattern printed thereon are sequentially laminated for the inner layer portion 100. On the inner layer portion 100, a predetermined number of dielectric sheets including no internal electrode pattern printed thereon are laminated for the first outer layer portion 101. In this way, a multilayer sheet is produced.

Next, the multilayer sheet is pressed in the lamination direction by, for example, hydrostatic pressing or other method to prepare a multilayer block. Next, multilayer chips are cut out from the multilayer block by cutting the multilayer block into a predetermined size. In this step, dielectric sheets for forming the first side margin portion W11 and the second side margin portion W12 may be attached to lateral surfaces of each multilayer chip. In this step, furthermore, the corner portions and ridge portions of each multilayer chip are rounded by, for example, barrel polishing or other method. Next, each multilayer chip is fired to prepare the multilayer body 10. The firing temperature depends on the material of the dielectric and the internal electrodes, but may be, for example, about 900° C. or higher and about 1400° C. or lower.

Next, an electrically conductive paste is applied to the first end surface LS1 of the multilayer body 10 as an electrode material for the first base electrode layer 415 by immersing the first end surface LS1 in the electrically conductive paste by, for example, a dipping method. Similarly, an electrically conductive paste is applied to the second end surface LS2 of the multilayer body 10 as an electrode material for the second base electrode layer 425 by immersing the second end surface LS2 in the electrically conductive paste by, for example, a dipping method. Furthermore, an electrically conductive paste is applied to the first lateral surface WS1 of the multilayer body 10 as an electrode material for the third base electrode layer 435 by, for example, a coating method. Similarly, an electrically conductive paste is applied to the second lateral surface WS2 of the multilayer body 10 as an electrode material for the fourth base electrode layer 445 by, for example, a coating method. Thereafter, these conductive pastes are fired to form the fired layers, i.e., the first base electrode layer 415, the second base electrode layer 425, the third base electrode layer 435, and the fourth base electrode layer 445. The firing temperature is preferably, for example, about 600° C. or higher and about 900° C. or lower.

As described above, the first base electrode layer 415, the second base electrode layer 425, the third base electrode layer 435, and the fourth base electrode layer 445 may be formed as resin layers by applying an electrically conductive paste containing electrically conductive particles and a thermosetting resin by a coating method, and firing the electrically conductive paste. Alternatively, the first base electrode layer 415, the second base electrode layer 425, the third base electrode layer 435, and the fourth base electrode layer 445 may be formed as thin films by a thin film formation method such as, for example, a sputtering method or a vapor deposition method.

In the description provided above, the multilayer chip is fired, and then the base electrode layers are formed and fired. That is, the multilayer body and the external electrodes are fired separately. However, the base electrode layers may be formed before firing the multilayer chip, and then fired. That is, the multilayer body and the external electrodes may be fired simultaneously.

Thereafter, the first plated layer 416 is formed on the surface of the first base electrode layer 415 to form the first external electrode 41, and the second plated layer 426 is formed on the surface of the second base electrode layer 425 to form the second external electrode 42. Furthermore, the third plated layer 436 is formed on the surface of the third base electrode layer 435 to form the third external electrode 43, and the fourth plated layer 446 is formed on the surface of the fourth base electrode layer 445 to form the fourth external electrode 44. Through the steps described above, the multilayer ceramic capacitor 1 described above is obtained.

In the case of a two-terminal multilayer ceramic capacitor, which includes the first external electrode 41 on the first end surface LS1 and the second external electrode 42 on the second end surface LS2, current (AC) flows between the first external electrode 41 and the second external electrode 42, and thus the current path is relatively long and the equivalent series inductance (ESL) is relatively high.

In contrast, in the case of the three-terminal multilayer ceramic capacitor 1 according to the present example embodiment, which further includes the third external electrode 43 on the first lateral surface WS1 as the third external electrode and the fourth external electrode 44 on the second lateral surface WS2, current (AC) flows from the first external electrode 41 on the first end surface LS1 to the third external electrode 43 on the first lateral surface WS1 and the fourth external electrode 44 on the second lateral surface WS2, and current (AC) flows from the second external electrode 42 on the second end surface LS2 to the third external electrode 43 on the first lateral surface WS1 and the fourth external electrode 44 on the second lateral surface WS2 as shown in FIG. 6. This configuration allows for a reduction in current path length, and thus helps to achieve a reduction in equivalent series inductance (ESL) (lower ESL).

Current has the characteristic of flowing through a path having the shortest distance. As indicated by the arrows in FIG. 6, therefore, current concentrates on the side portion of each first internal electrode layer 31 adjacent to the first lateral surface WS1 and the side portion thereof adjacent to the second lateral surface WS2, and on the end portion of each second internal electrode layer 32 adjacent to the first end surface LS1 and the end portion thereof adjacent to the second end surface LS2.

In this regard, in the case of the three-terminal multilayer ceramic capacitor 1 according to the present example embodiment, the coverage ratio in the region R11, the coverage ratio in the region R12, the coverage ratio in the region R13, and the coverage ratio in the region R14 in the side portions of each first internal electrode layer 31 adjacent to the first lateral surface WS1 and the second lateral surface WS2 are higher than the coverage ratio in the region R15 in the middle portion located between these side portions, and the coverage ratio in the region R21, the coverage ratio in the region R22, the coverage ratio in the region R23, and the coverage ratio in the region R24 in the end portions of each second internal electrode layer 32 adjacent to the first end surface LS1 and the second end surface LS2 are higher than the coverage ratio in the region R15 in the middle portion located between these end portions. This configuration helps to achieve a further reduction in equivalent series inductance (ESL) (lower ESL).

Furthermore, in the case of the three-terminal multilayer ceramic capacitor 1 according to the present example embodiment, the thickness of the region R11, the thickness of the region R12, the thickness of the region R13, and the thickness of the region R14 of each first internal electrode layer 31 are greater than the thickness of the region R15, and the thickness of the region R21, the thickness of the region R22, the thickness of the region R23, and the thickness of the region R24 of each second internal electrode layer 32 are greater than the thickness of the region R15. This configuration helps to achieve a further reduction in equivalent series inductance (ESL) (lower ESL).

Figure 7:
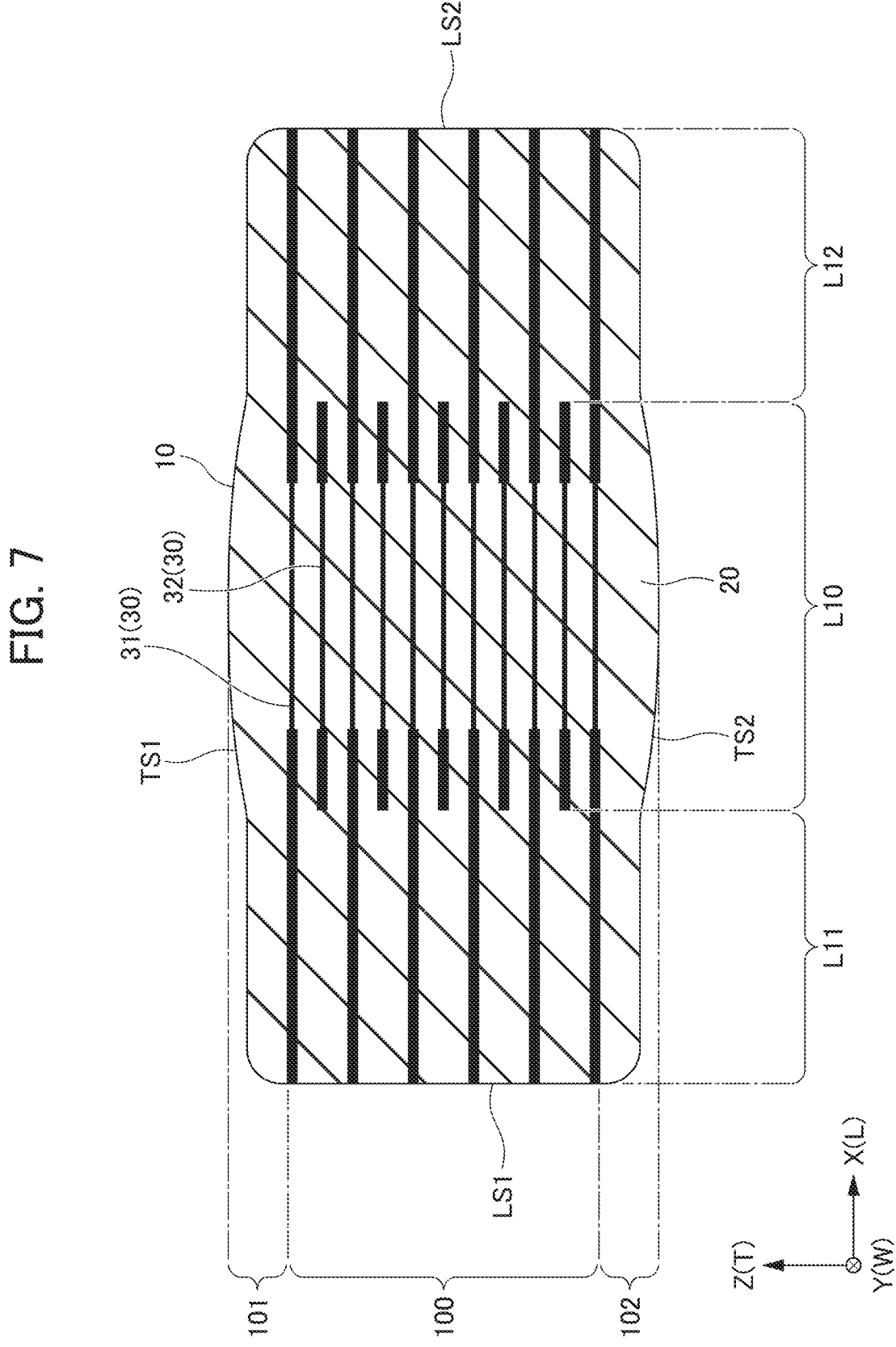
FIG. 7 is a cross-sectional view (LT cross section) taken along line VII-VII of the multilayer body shown in FIG. 6.

Incidentally, multilayer ceramic capacitors are desired to have a larger capacitance in a specified size. FIG. 7 is a cross-sectional view (LT cross section) taken along line VII-VII of the multilayer body shown in FIG. 6 in the multilayer ceramic capacitor according to the present example embodiment, and FIG. 8 is a cross-sectional view (WT cross section) taken along line VIII-VIII of the multilayer body shown in FIG. 6 in the multilayer ceramic capacitor according to the present example embodiment.

Figure 8:
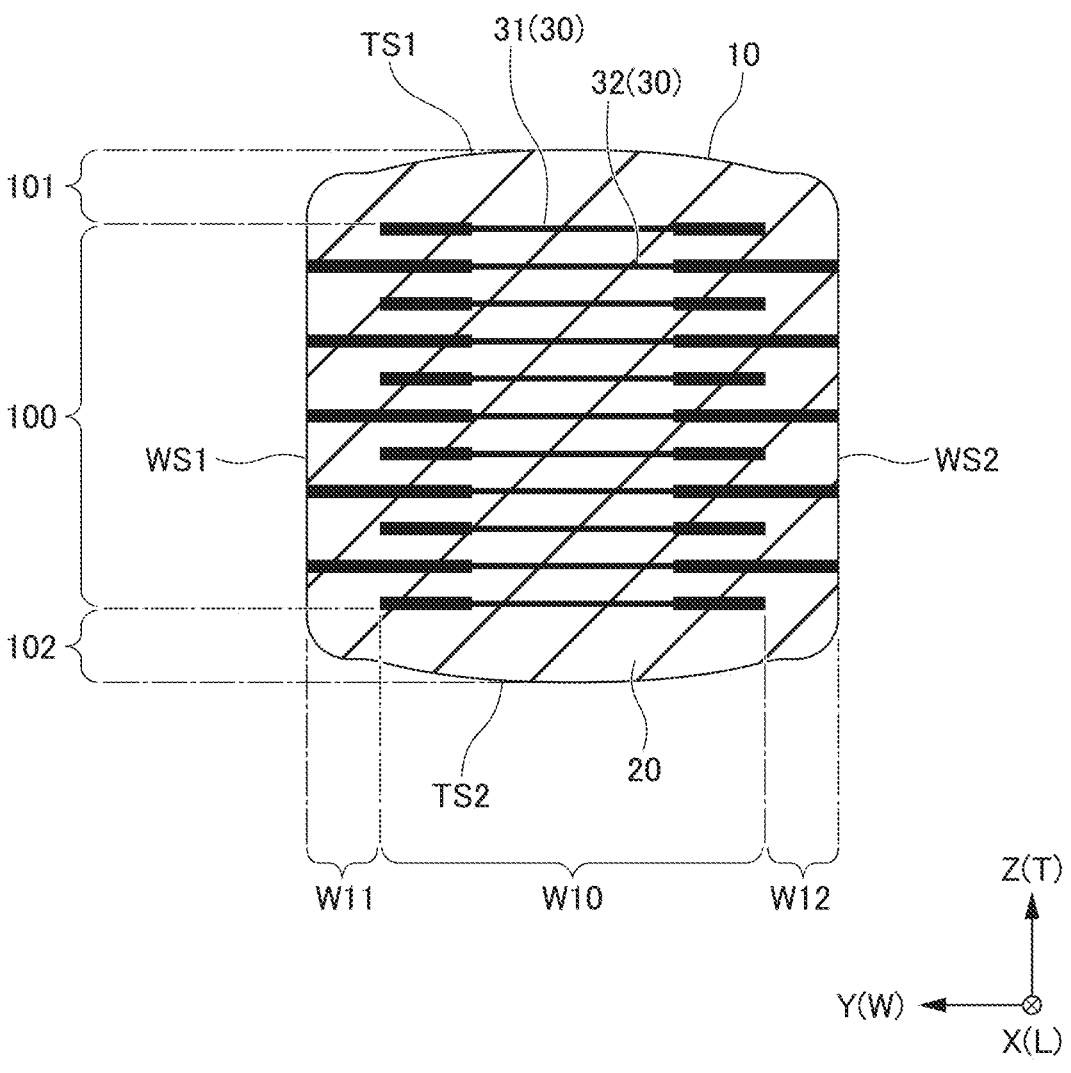
FIG. 8 is a cross-sectional view (WT cross section) taken along line VIII-VIII of the multilayer body shown in FIG. 6.
Figure 13:
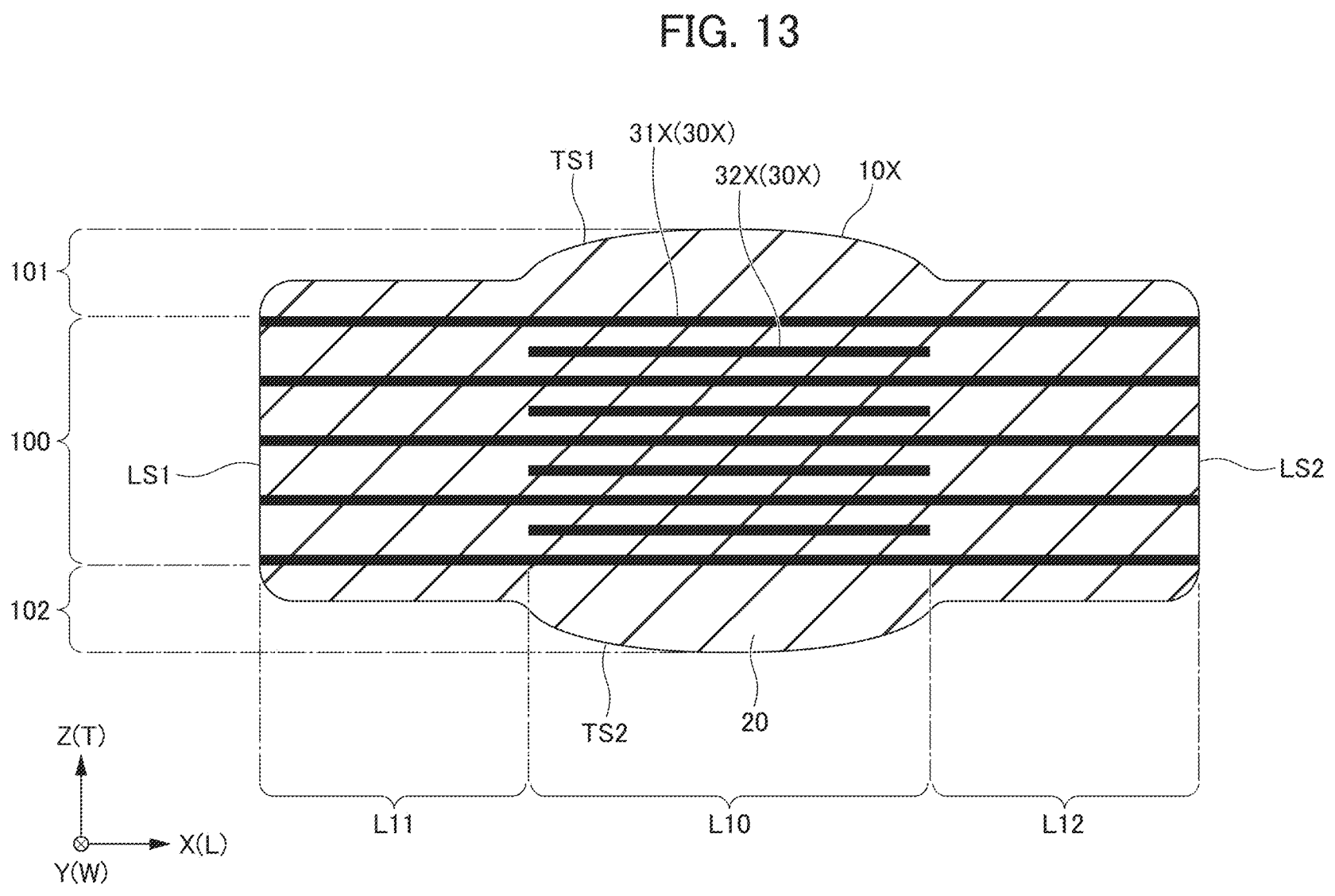
Figure 14:
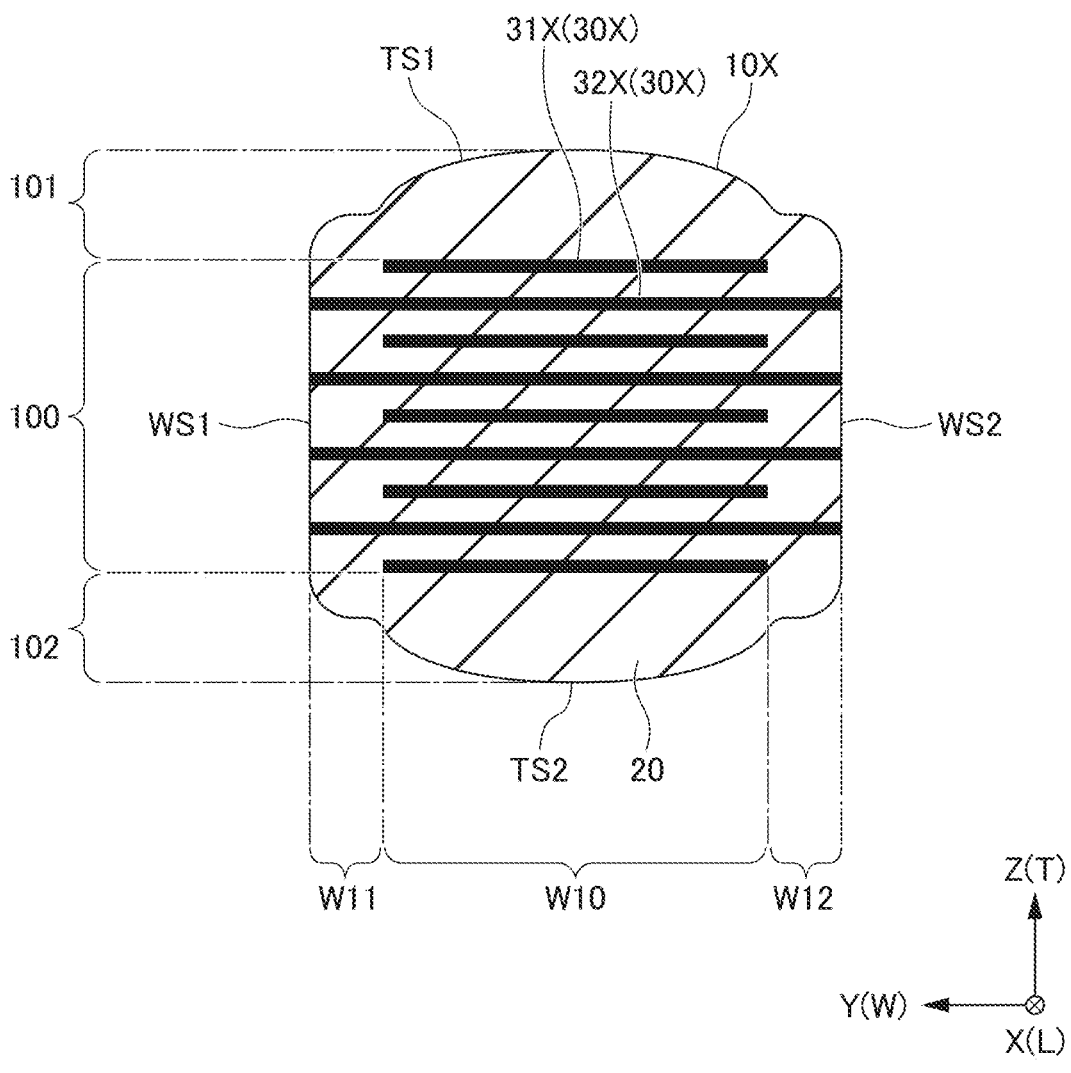
FIG. 14 is a cross-sectional view showing a WT cross section of the multilayer body in the conventional multilayer ceramic capacitor and corresponding to FIG. 8.

FIG. 13 is a cross-sectional view showing an LT cross section of the multilayer body in a conventional multilayer ceramic capacitor and corresponding to FIG. 7, and FIG. 14 is a cross-sectional view showing a WT cross section of the multilayer body in the conventional multilayer ceramic capacitor and corresponding to FIG. 8.

In a multilayer body 10X of the conventional multilayer ceramic capacitor, as shown in FIG. 13, the number of internal electrode layers 30X in the electrode counter portion (effective portion) L10 is greater than the number of internal electrode layers 30X in the end margin portions L11 and L12, and therefore the thickness of the electrode counter portion (effective portion) L10 in the lamination direction T is greater than the thickness of the end margin portions L11 and L12 in the lamination direction T. Furthermore, in the multilayer body 10X of the conventional multilayer ceramic capacitor, as shown in FIG. 14, the number of internal electrode layers 30X in the electrode counter portion (effective portion) W10 is greater than the number of internal electrode layers 30X in the side margin portions W11 and W12, and therefore the thickness of the electrode counter portion (effective portion) W10 in the lamination direction T is greater than the thickness of the side margin portions W11 and W12 in the lamination direction T.

Furthermore, in the multilayer body 10X, the thickness in the lamination direction T tends to gradually increase from the end surfaces LS1 and LS2 toward the center as shown in FIG. 13, and the thickness in the lamination direction T tends to gradually increase from the lateral surfaces WS1 and WS2 toward the center as shown in FIG. 14. Thus, the thickness of the center of the multilayer body 10X creates a constraint on the number of internal electrode layers 30X, thus restricting the capacitance.

In this regard, in the multilayer ceramic capacitor 1 according to the present example embodiment, the thickness of the central portion of the first counter electrode portion 311 of each first internal electrode layer 31 in the length direction L and the width direction W, that is, the thickness of the region R15 in the central portion of the multilayer body 10 in the length direction L and the width direction W is less than the thickness of the region R11, the thickness of the region R12, the thickness of the region R13, and the thickness of the region R14 as shown in FIGS. 4, 6, 7 and 8. Furthermore, the thickness of the central portion of the second counter electrode portion 321 of each second internal electrode layer 32 in the length direction L and the width direction W, that is, the thickness of the region R25 in the central portion of the multilayer body 10 in the length direction L and the width direction W is less than the thickness of the region R21, the thickness of the region R22, the thickness of the region R23, and the thickness of the region R24 as shown in FIGS. 5, 6, 7 and 8. This configuration allows for an increase in the number of internal electrode layers 30, and thus helps to achieve a larger capacitance.

As shown in FIGS. 13 and 14, the end margin portions L11 and L12, and the side margin portions W11 and W12 include fewer internal electrode layers 30X and are thinner than the electrode counter portions (effective portions) L10 and W10. Even if the number of internal electrode layers 30 is increased, therefore, the end margin portions L11 and L12, and the side margin portions W11 and W12 do not exceed the thickness specified for the multilayer body 10 as shown in FIGS. 7 and 8.

Furthermore, as shown in FIGS. 13 and 14, the thickness in the lamination direction T tends to gradually increase from the end surfaces LS1 and LS2, and the lateral surfaces WS1 and WS2 toward the center. As shown in FIGS. 7 and 8, therefore, even the overlap regions R31, R32, R33 and R34, in particular, do not exceed the thickness specified for the multilayer body 10.

Modified Example

Figure 9:
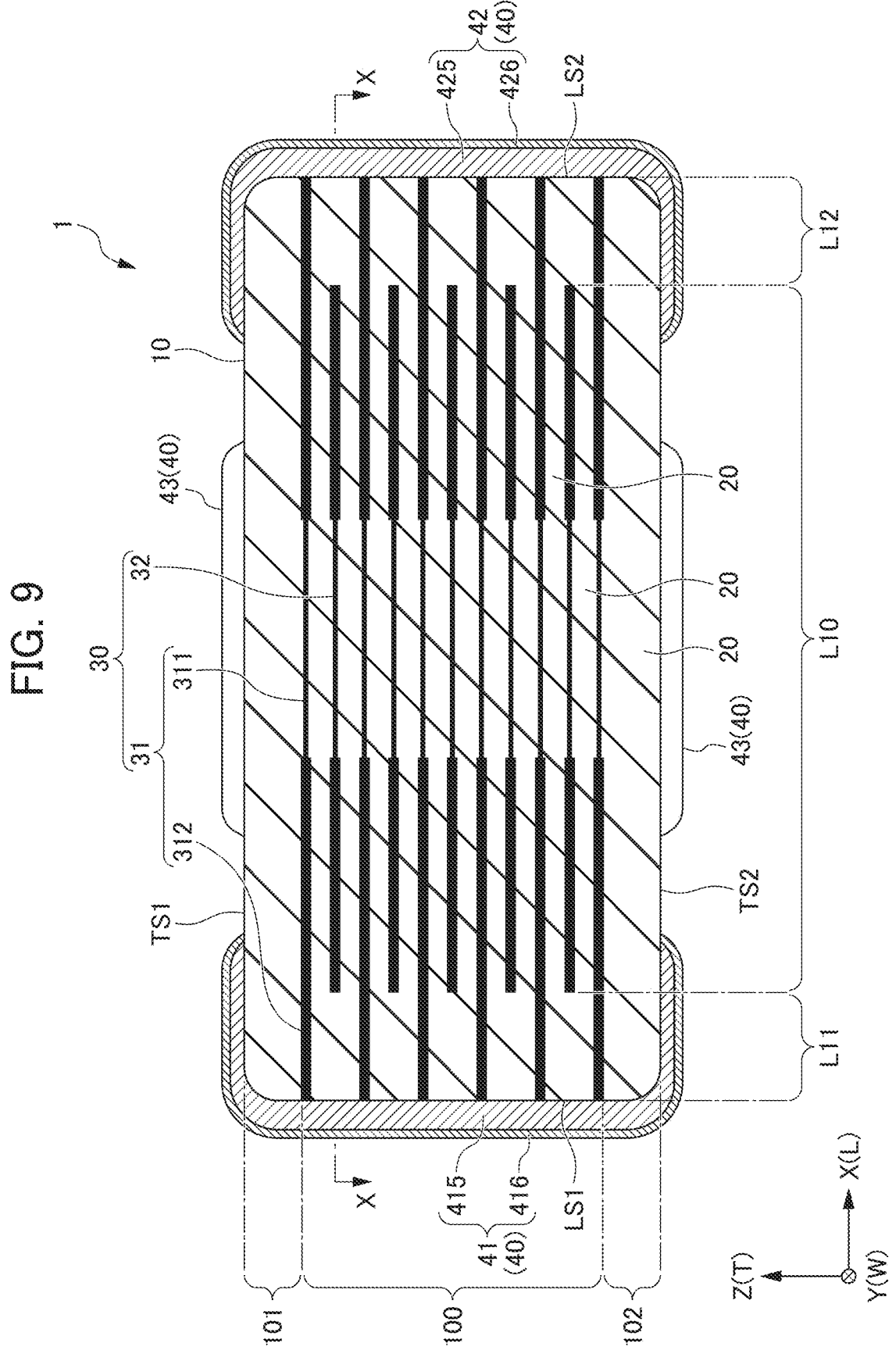
FIG. 9 is a cross-sectional view showing an LT cross section of a multilayer ceramic capacitor according to a modified example of the example embodiment of the present invention and corresponding to FIG. 2.
Figure 10:
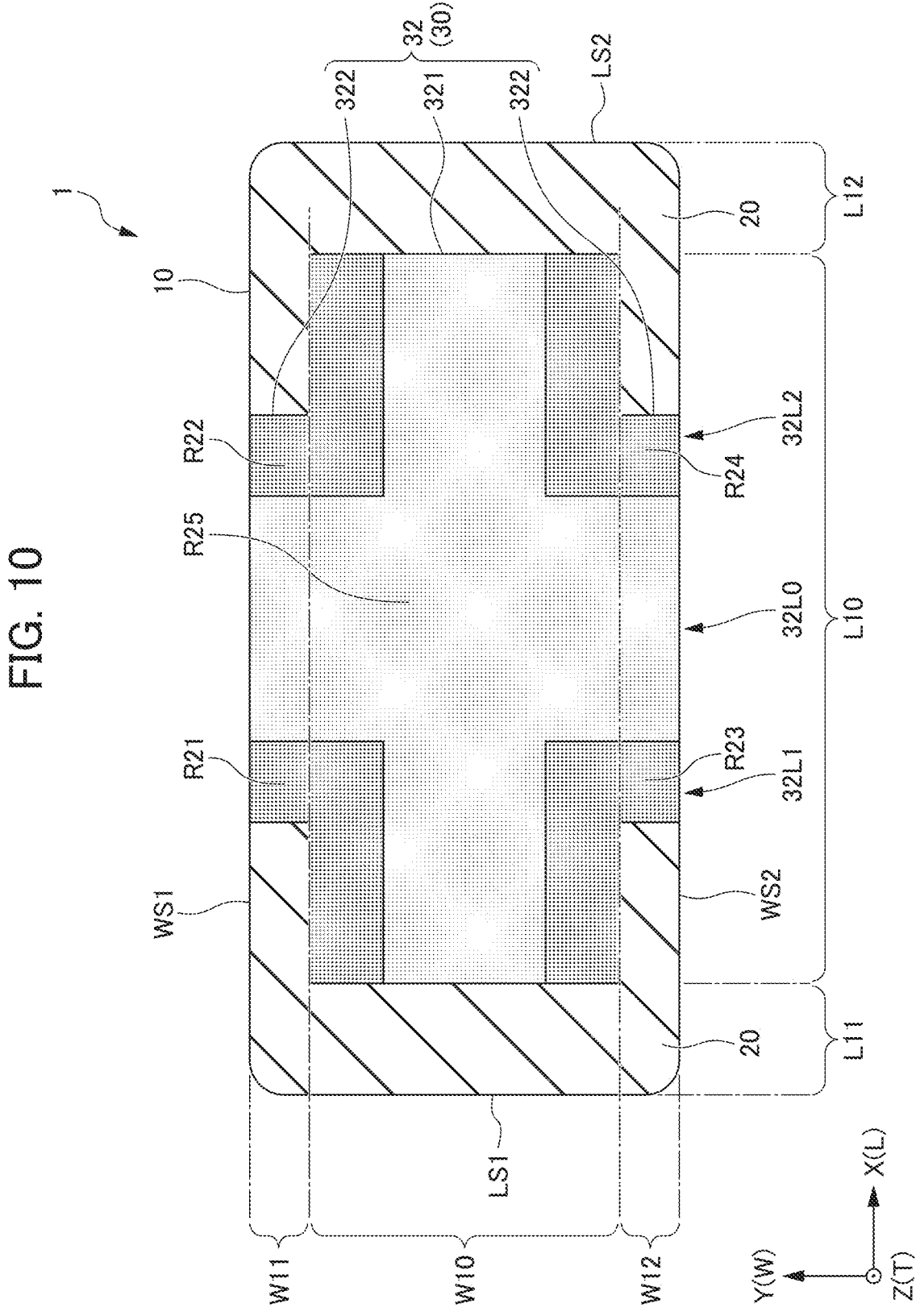
FIG. 10 is a cross-sectional view (LW cross section) taken along line X-X of a multilayer body of the multilayer ceramic capacitor shown in FIG. 9, and is an LW cross-sectional view including second internal electrode layers and corresponding to FIG. 5.
Figure 11:
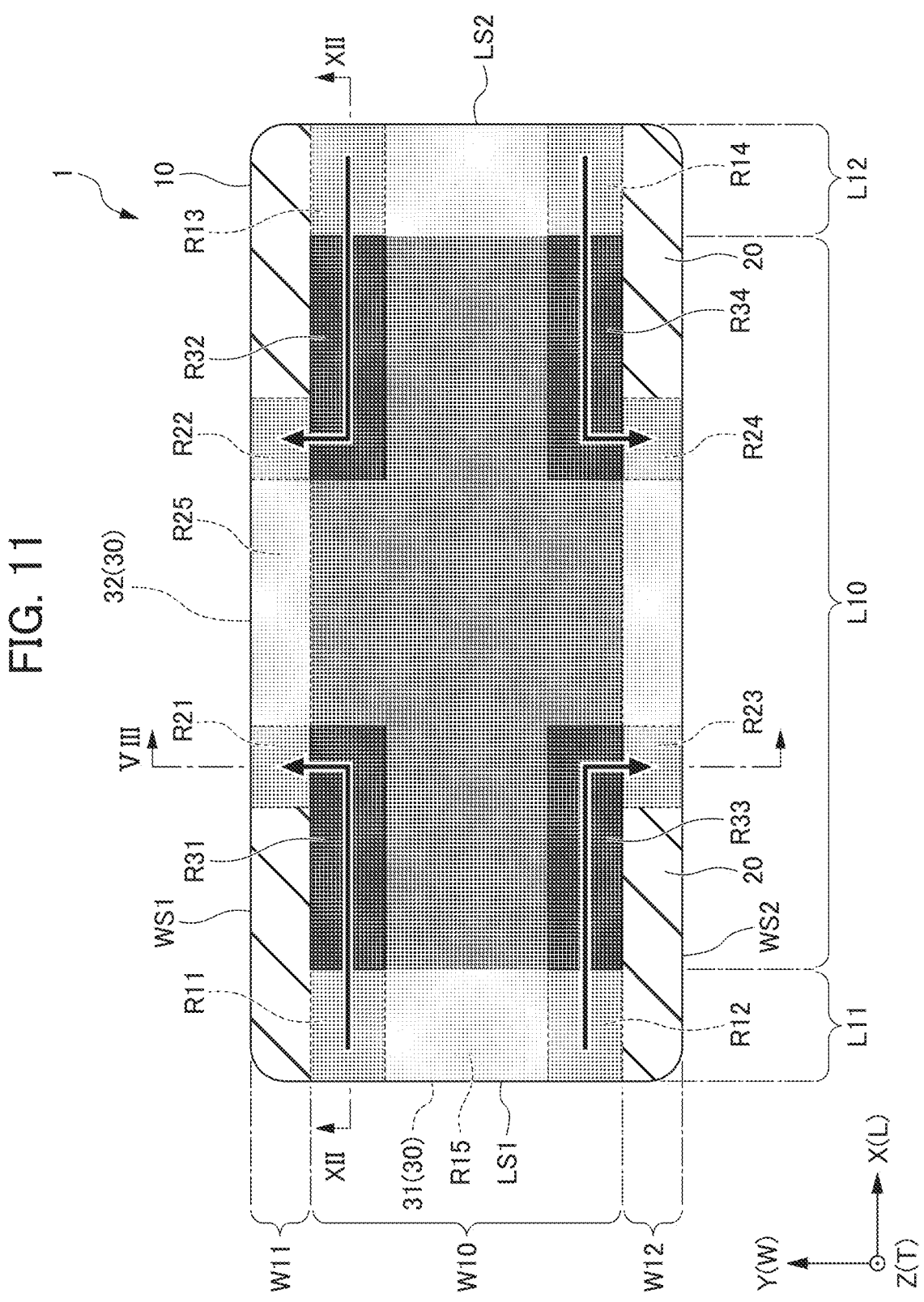
FIG. 11 is an overlaid cross-sectional view (LW cross section) including the cross section of the multilayer body shown in FIG. 4 and the cross section of the multilayer body shown in FIG. 10, in which the first internal electrode layers and the second internal electrode layers are overlaid on each other.
Figure 12:
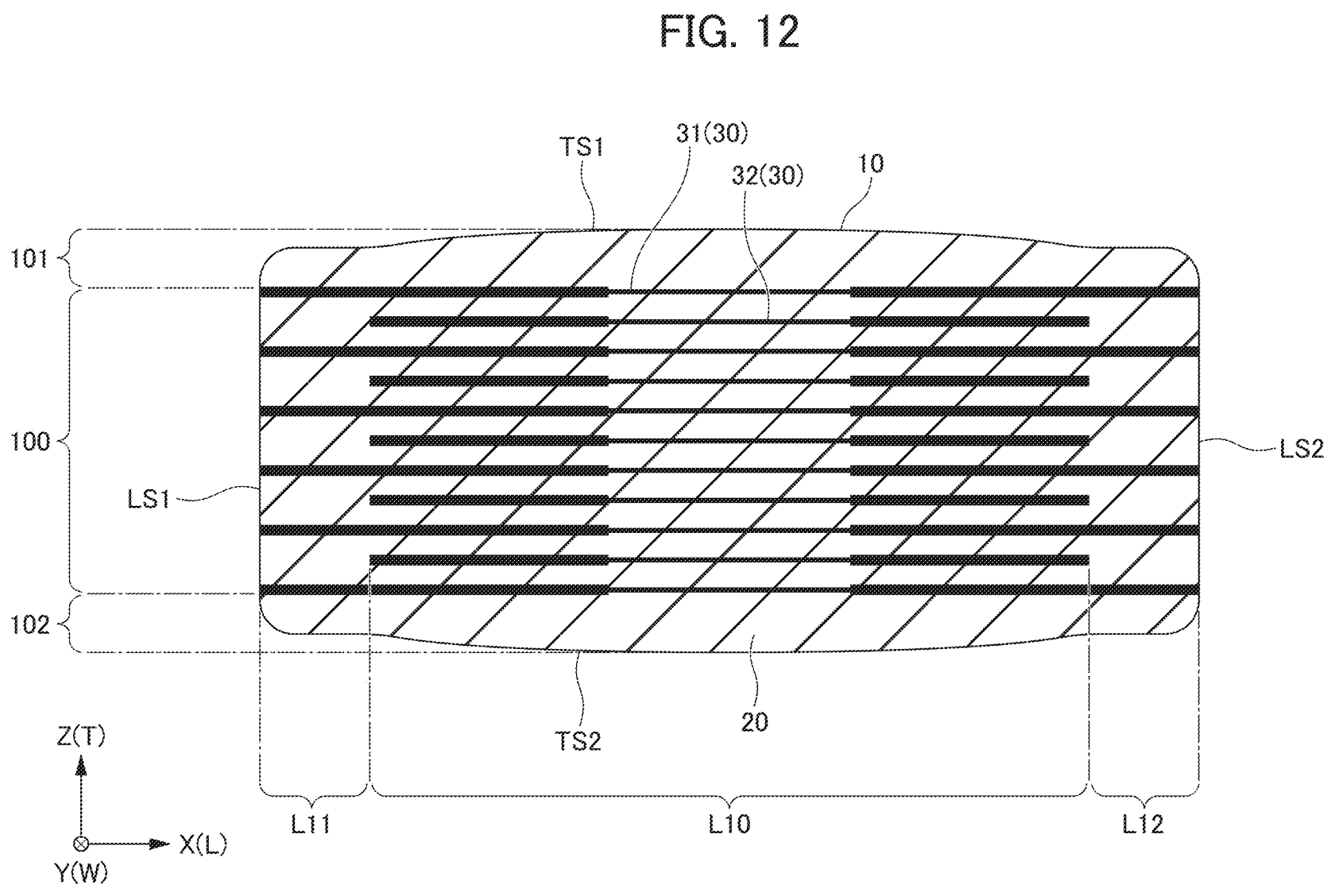

FIG. 9 is a cross-sectional view showing an LT cross section of a multilayer ceramic capacitor according to a modified example of the present example embodiment and corresponding to FIG. 2. FIG. 10 is a cross-sectional view (LW cross section) taken along line X-X of a multilayer body of the multilayer ceramic capacitor shown in FIG. 9, and is an LW cross-sectional view including second internal electrode layers and corresponding to FIG. 5. FIG. 11 is an overlaid cross-sectional view (LW cross section) including the cross section of the multilayer body shown in FIG. 4 and the cross section of the multilayer body shown in FIG. 10, in which the first internal electrode layers and the second internal electrode layers are overlaid on each other. FIG. 12 is a cross-sectional view (LT cross section) taken along line XII-XII of the multilayer body shown in FIG. 11, and is an LT cross-sectional view corresponding to FIG. 7.

As shown in FIGS. 9 and 10, the second internal electrode layers 32 may be elongated in the length direction L to provide a larger capacitance. As shown in FIG. 10, the present modified example also has a configuration in which the second internal electrode layers 32 each include, in the length direction L, the end portion 32L1 adjacent to the first end surface LS1, the end portion 32L2 adjacent to the second end surface LS2, and the second middle portion 32L0 located between the end portion 32L1 and the end portion 32L2.

The second internal electrode layers 32 each include the region R21 and the region R23 in the end portion 32L1, and the region R22 and the region R24 in the end portion 32L2. The region R21 in the end portion 32L1 extends from the first lateral surface WS1 to a portion of the second counter electrode portion 321 adjacent to the first lateral surface WS1 in the electrode counter portion W10 of the multilayer body 10. The region R22 in the end portion 32L2 extends from the first lateral surface WS1 to a portion of the second counter electrode portion 321 adjacent to the first lateral surface WS1. The region R23 in the end portion 32L1 extends from the second lateral surface WS2 to a portion of the second counter electrode portion 321 adjacent to the second lateral surface WS2. The region R24 in the end portion 32L2 extends from the second lateral surface WS2 to a portion of the second counter electrode portion 321 adjacent to the second lateral surface WS2.

The second internal electrode layers 32 also each include the region 25, which is a remaining region other than the region R21, the region R22, the region R23, and the region R24. The region R25 includes the second middle portion 32L0. The region R25 also includes a central portion of the second counter electrode portion 321 in the length direction L and the width direction W, and a central portion of the multilayer body 10 in the length direction L and the width direction W.

In each second internal electrode layer 32, the coverage ratio in the region R21, the coverage ratio in the region R22, the coverage ratio in the region R23, and the coverage ratio in the region R24 are higher than the coverage ratio in the region R25. Preferably, for example, the coverage ratio in the region R21×about 0.95, the coverage ratio in the region R22×about 0.95, the coverage ratio in the region R23×about 0.95, and the coverage ratio in the region R24×about 0.95 are higher than the coverage ratio in the region R25.

As shown in FIGS. 9, 3, and 10, in each second internal electrode layer 32, the thickness of the region R21 in the lamination direction T, the thickness of the region R22 in the lamination direction T, the thickness of the region R23 in the lamination direction T, and the thickness of the region R24 in the lamination direction T are greater than the thickness of the region R25 in the lamination direction T. In other words, in each second internal electrode layer 32, the thickness of the region R25 in the lamination direction T is less than the thickness of the region R21 in the lamination direction T, the thickness of the region R22 in the lamination direction T, the thickness of the region R23 in the lamination direction T, and the thickness of the region R24 in the lamination direction T.

As shown in FIG. 11, the present modified example also has a configuration in which the region R11 of each first internal electrode layer 31 and the region R21 of each second internal electrode layer 32 overlap in the lamination direction T in the region R31. The region R31 is a portion of the first counter electrode portion 311 adjacent to the first end surface LS1 in the side portion 31W1 of the first internal electrode layer 31. The region R31 is also a portion of the second counter electrode portion 321 adjacent to the first lateral surface WS1 in the end portion 32L1 of the second internal electrode layer 32. This configuration allows a current path to be provided from the region R11 of the first internal electrode layer 31 to the region R21 of the second internal electrode layer 32, as indicated by an arrow in FIG. 11.

The region R12 of each first internal electrode layer 31 and the region R23 of each second internal electrode layer 32 overlap in the lamination direction T in the region R33. The region R33 is a portion of the first counter electrode portion 311 adjacent to the first end surface LS1 in the side portion 31W2 of the first internal electrode layer 31. The region R33 is also a portion of the second counter electrode portion 321 adjacent to the second lateral surface WS2 in the end portion 32L1 of the second internal electrode layer 32. This configuration allows a current path to be provided from the region R12 of the first internal electrode layer 31 to the region R23 of the second internal electrode layer 32, as indicated by an arrow in FIG. 11.

The region R13 of each first internal electrode layer 31 and the region R22 of each second internal electrode layer 32 overlap in the lamination direction T in the region R32. The region R32 is a portion of the first counter electrode portion 311 adjacent to the second end surface LS2 in the side portion 31W1 of the first internal electrode layer 31. The region R32 is also a portion of the second counter electrode portion 321 adjacent to the first lateral surface WS1 in the end portion 32L2 of the second internal electrode layer 32. This configuration allows a current path to be provided from the region R13 of the first internal electrode layer 31 to the region R22 of the second internal electrode layer 32, as indicated by an arrow in FIG. 11.

The region R14 of each first internal electrode layer 31 and the region R24 of each second internal electrode layer 32 overlap in the lamination direction T in the region R34. The region R34 is a portion of the first counter electrode portion 311 adjacent to the second end surface LS2 in the side portion 31W2 of the first internal electrode layer 31. The region R34 is also a portion of the second counter electrode portion 321 adjacent to the second lateral surface WS2 in the end portion 32L2 of the second internal electrode layer 32. This configuration allows a current path to be provided from the region R14 of the first internal electrode layer 31 to the region R24 of the second internal electrode layer 32, as indicated by an arrow in FIG. 11.

As in the case of the foregoing example embodiment, the present modified example achieves a further reduction in equivalent series inductance (ESL) (lower ESL). As in the case of the foregoing example embodiment, as shown in FIG. 12, the present modified example allows for an increase in the number of internal electrode layers 30, and thus achieves a larger capacitance.

Example embodiments of the present invention have been described above. However, the present invention is not limited to the foregoing example embodiments, and various changes and modifications can be made. For example, the foregoing example embodiments are described using an example in which in each first internal electrode layer 31, the coverage ratio in the region R11, the coverage ratio in the region R12, the coverage ratio in the region R13, and the coverage ratio in the region R14 are higher than the coverage ratio in the region R15, and in each second internal electrode layer 32, the coverage ratio in the region R21, the coverage ratio in the region R22, the coverage ratio in the region R23, and the coverage ratio in the region R24 are higher than the coverage ratio in the region R25. However, the present invention is not limited to the foregoing example embodiments, and may include, for example, an example embodiment in which the coverage ratios satisfy the above-described relationship in either the first internal electrode layers 31 or the second internal electrode layers 32.

Alternatively, the present invention may include, for example, an example embodiment in which the coverage ratios satisfy the above-described relationship in at least one of the plurality of first internal electrode layers 31. Alternatively, the present invention may include, for example, an example embodiment in which only the coverage ratio in the region R11 and the coverage ratio in the region R12 satisfy the above-described relationship, or an example embodiment in which only the coverage ratio in the region R13 and the coverage ratio in the region R14 satisfy the above-described relationship.

Alternatively, the present invention may include, for example, an example embodiment in which the coverage ratios satisfy the above-described relationship in at least one of the plurality of second internal electrode layers 32. Alternatively, the present invention may include, for example, an example embodiment in which only the coverage ratio in the region R21 and the coverage ratio in the region R22 satisfy the above-described relationship, or an example embodiment in which only the coverage ratio in the region R23 and the coverage ratio in the region R24 satisfy the above-described relationship.

For another example, the foregoing example embodiments are described using an example in which in each first internal electrode layer 31, the thickness of the region R11 in the lamination direction T, the thickness of the region R12 in the lamination direction T, the thickness of the region R13 in the lamination direction T, and the thickness of the region R14 in the lamination direction T are greater than the thickness of the region R15 in the lamination direction T, and in each second internal electrode layer 32, the thickness of the region R21 in the lamination direction T, the thickness of the region R22 in the lamination direction T, the thickness of the region R23 in the lamination direction T, and the thickness of the region R24 in the lamination direction T are greater than the thickness of the region R25 in the lamination direction T. In other words, in each first internal electrode layer 31, the thickness of the region R15 in the lamination direction T is less than the thickness of the region R11 in the lamination direction T, the thickness of the region R12 in the lamination direction T, the thickness of the region R13 in the lamination direction T, and the thickness of the region R14 in the lamination direction T, and in each second internal electrode layer 32, the thickness of the region R25 in the lamination direction T is less than the thickness of the region R21 in the lamination direction T, the thickness of the region R22 in the lamination direction T, the thickness of the region R23 in the lamination direction T, and the thickness of the region R24 in the lamination direction T. However, the present invention is not limited to the foregoing example embodiments, and may include, for example, an example embodiment in which the thicknesses satisfy the above-described relationship in either the first internal electrode layers 31 or the second internal electrode layers 32.

Alternatively, the present invention may include, for example, an example embodiment in which the thicknesses satisfy the above-described relationship in at least one of the plurality of first internal electrode layers 31. Alternatively, the present invention may include, for example, an example embodiment in which only the thickness of the region R11 and the thickness of the region R13 satisfy the above-described relationship, or an example embodiment in which only the thickness of the region R12 and the thickness of the region R14 satisfy the above-described relationship.

Alternatively, the present invention may include, for example, an example embodiment in which the thicknesses satisfy the above-described relationship in at least one of the plurality of second internal electrode layers 32. Alternatively, the present invention may include, for example, an example embodiment in which only the thickness of the region R21 and the thickness of the region R23 satisfy the above-described relationship, or an example embodiment in which only the thickness of the region R22 and the thickness of the region R24 satisfy the above-described relationship.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of dielectric layers made of a ceramic material and a plurality of internal electrode layers laminated therein, the multilayer body including first and second main surfaces opposed to each other in a lamination direction, first and second lateral surfaces opposed to each other in a width direction intersecting the lamination direction, and first and second end surfaces opposed to each other in a length direction intersecting the lamination direction and the width direction;

first and second external electrodes respectively provided on the first and second end surfaces of the multilayer body; and third and fourth external electrodes respectively provided on the first and second lateral surfaces of the multilayer body; wherein the plurality of internal electrode layers include a plurality of first internal electrode layers each including a first counter electrode portion and a plurality of second internal electrode layers each including a second counter electrode portion, the first counter electrode portion and the second counter electrode portion being opposed to each other in the lamination direction, the plurality of first internal electrode layers extending in the length direction and being connected to the first and second external electrodes, the plurality of second internal electrode layers extending in the width direction and being connected to the third and fourth external electrodes;

the plurality of first internal electrode layers each include, in the width direction, a side portion adjacent to the first lateral surface, a side portion adjacent to the second lateral surface, and a first middle portion located between the side portion adjacent to the first lateral surface and the side portion adjacent to the second lateral surface, and each include:

a region R11 located in the side portion adjacent to the first lateral surface and extending from the first end surface to a portion of the first counter electrode portion adjacent to the first end surface;

a region R12 located in the side portion adjacent to the second lateral surface and extending from the first end surface to a portion of the first counter electrode portion adjacent to the first end surface;

a region R13 located in the side portion adjacent to the first lateral surface and extending from the second end surface to a portion of the first counter electrode portion adjacent to the second end surface;

a region R14 located in the side portion adjacent to the second lateral surface and extending from the second end surface to a portion of the first counter electrode portion adjacent to the second end surface; and a region R15 that is a remaining region other than the region R11, the region R12, the region R13, and the region R14, and includes the first middle portion; and in at least one of the plurality of first internal electrode layers, a coverage ratio in the region R11 and a coverage ratio in the region R12 are higher than a coverage ratio in the region R15, and/or a coverage ratio in the region R13 and a coverage ratio in the region R14 are higher than the coverage ratio in the region R15.

2. The multilayer ceramic capacitor according to claim 1, wherein the region R15 in each of the plurality of first internal electrode layers further includes a central portion of the first counter electrode portion in the length direction and the width direction, and a central portion of the multilayer body in the length direction and the width direction; and in at least one of the plurality of first internal electrode layers, a thickness of the region R11 in the lamination direction and a thickness of the region R13 in the lamination direction are greater than a thickness of the region R15 in the lamination direction, and/or a thickness of the region R12 in the lamination direction and a thickness of the region R14 in the lamination direction are greater than the thickness of the region R15 in the lamination direction.

3. The multilayer ceramic capacitor according to claim 1, wherein the plurality of second internal electrode layers each include, in the length direction, an end portion adjacent to the first end surface, an end portion adjacent to the second end surface, and a second middle portion located between the end portion adjacent to the first end surface and the end portion adjacent to the second end surface; and each include:

a region R21 located in the end portion adjacent to the first end surface and extending from the first lateral surface to a portion of the second counter electrode portion adjacent to the first lateral surface;

a region R22 located in the end portion adjacent to the second end surface and extending from the first lateral surface to a portion of the second counter electrode portion adjacent to the first lateral surface;

a region R23 located in the end portion adjacent to the first end surface and extending from the second lateral surface to a portion of the second counter electrode portion adjacent to the second lateral surface;

a region R24 located in the end portion adjacent to the second end surface and extending from the second lateral surface to a portion of the second counter electrode portion adjacent to the second lateral surface; and a region R25 that is a remaining region other than the region R21, the region R22, the region R23, and the region R24, and includes the second middle portion; and in at least one of the plurality of second internal electrode layers, a coverage ratio in the region R21 and a coverage ratio in the region R22 are higher than a coverage ratio in the region R25, and/or a coverage ratio in the region R23 and a coverage ratio of in the region R24 are higher than the coverage ratio in the region R25.

4. The multilayer ceramic capacitor according to claim 3, wherein the region R25 in each of the plurality of second internal electrode layers further includes a central portion of the second counter electrode portion in the length direction and the width direction, and a central portion of the multilayer body in the length direction and the width direction; and in at least one of the plurality of second internal electrode layers, a thickness of the region R21 in the lamination direction and a thickness of the region R23 in the lamination direction are greater than a thickness of the region R25 in the lamination direction, and/or a thickness of the region R22 in the lamination direction and a thickness of the region R24 in the lamination direction are greater than the thickness of the region R25 in the lamination direction.

5. The multilayer ceramic capacitor according to claim 1, wherein each of the plurality of dielectric layers includes BaTiO$_3$, CaTiO$_3$, SrTiO$_3$, or CaZrO$_3$ as a main component.

6. The multilayer ceramic capacitor according to claim 5, wherein each of the plurality of dielectric layers includes at least one of Mg, Si, Mn, a rare earth element, Al, Ni, or V as a subcomponent.

7. The multilayer ceramic capacitor according to claim 6, wherein each of the rare earth element includes at least one of La, Ce, Pr, Nd, Sm, Eu, Gd, Tb, Dy, Ho, Er, Tm, Yb, Lu, or Y.

8. The multilayer ceramic capacitor according to claim 1, wherein a thickness of each of the plurality of dielectric layers is about 0.40 μm or more and about 5.0 μm or less.

9. The multilayer ceramic capacitor according to claim 1, wherein a number of the plurality of dielectric layers is 10 or more and 2000 or less.

10. The multilayer ceramic capacitor according to claim 1, wherein each of the plurality of internal electrode layers includes at least one of Cu, Ag, Pd, or Au, or an alloy including at least one of Cu, Ag, Pd, or Au as a main component.

11. The multilayer ceramic capacitor according to claim 1, wherein a thickness of each of the plurality of internal electrode layers is about 0.40 μm or more and about 5.0 μm or less.

12. A multilayer ceramic capacitor comprising:

a multilayer body including a plurality of dielectric layers made of a ceramic material and a plurality of internal electrode layers laminated therein, the multilayer body including first and second main surfaces opposed to each other in a lamination direction, first and second lateral surfaces opposed to each other in a width direction intersecting the lamination direction, and first and second end surfaces opposed to each other in a length direction intersecting the lamination direction and the width direction;

first and second external electrodes respectively on the first and second end surfaces of the multilayer body; and third and fourth external electrodes respectively on the first and second lateral surfaces of the multilayer body; wherein the plurality of internal electrode layers include a plurality of first internal electrode layers each including a first counter electrode portion and a plurality of second internal electrode layers each including a second counter electrode portion, the first counter electrode portion and the second counter electrode portion being opposed to each other in the lamination direction, the plurality of first internal electrode layers extending in the length direction and being connected to the first and second external electrodes, the plurality of second internal electrode layers extending in the width direction and being connected to the third and fourth external electrodes;

the plurality of second internal electrode layers each include, in the length direction, an end portion adjacent to the first end surface, an end portion adjacent to the second end surface, and a second middle portion located between the end portion adjacent to the first end surface and the end portion adjacent to the second end surface; and each include:

a region R21 located in the end portion adjacent to the first end surface and extending from the first lateral surface to a portion of the second counter electrode portion adjacent to the first lateral surface;

a region R22 located in the end portion adjacent to the second end surface and extending from the first lateral surface to a portion of the second counter electrode portion adjacent to the first lateral surface;

a region R23 located in the end portion adjacent to the first end surface and extending from the second lateral surface to a portion of the second counter electrode portion adjacent to the second lateral surface;

a region R24 located in the end portion adjacent to the second end surface and extending from the second lateral surface to a portion of the second counter electrode portion adjacent to the second lateral surface; and a region R25 that is a remaining region other than the region R21, the region R22, the region R23, and the region R24, and includes the second middle portion; and in at least one of the plurality of second internal electrode layers, a coverage ratio in the region R21 and a coverage ratio in the region R22 are higher than a coverage ratio in the region R25, and/or a coverage ratio in the region R23 and a coverage ratio in the region R24 are higher than the coverage ratio in the region R25.

13. The multilayer ceramic capacitor according to claim 12, wherein
the region R25 in each of the plurality of second internal electrode layers further includes a central portion of the second counter electrode portion in the length direction and the width direction, and a central portion of the multilayer body in the length direction and the width direction; and
in at least one of the plurality of second internal electrode layers, a thickness of the region R21 in the lamination direction and a thickness of the region R23 in the lamination direction are greater than a thickness of the region R25 in the lamination direction, and/or a thickness of the region R22 in the lamination direction and a thickness of the region R24 in the lamination direction are greater than the thickness of the region R25 in the lamination direction.

14. The multilayer ceramic capacitor according to claim 12, wherein each of the plurality of dielectric layers includes $BaTiO_3$, $CaTiO_3$, $SrTiO_3$, or $CaZrO_3$ as a main component.

15. The multilayer ceramic capacitor according to claim 14, wherein each of the plurality of dielectric layers includes at least one of Mg, Si, Mn, a rare earth element, Al, Ni, or V as a subcomponent.

16. The multilayer ceramic capacitor according to claim 15, wherein each of the rare earth element includes at least one of La, Ce, Pr, Nd, Sm, Eu, Gd, Tb, Dy, Ho, Er, Tm, Yb, Lu, or Y.

17. The multilayer ceramic capacitor according to claim 12, wherein a thickness of each of the plurality of dielectric layers is about 0.40 μm or more and about 5.0 μm or less.

18. The multilayer ceramic capacitor according to claim 12, wherein a number of the plurality of dielectric layers is 10 or more and 2000 or less.

19. The multilayer ceramic capacitor according to claim 12, wherein each of the plurality of internal electrode layers includes at least one of Cu, Ag, Pd, or Au, or an alloy including at least one of Cu, Ag, Pd, or Au as a main component.

20. The multilayer ceramic capacitor according to claim 12, wherein a thickness of each of the plurality of internal electrode layers is about 0.40 μm or more and about 5.0 μm or less.

* * * * *